(12) United States Patent
Madkour et al.

(10) Patent No.: US 6,574,270 B1
(45) Date of Patent: Jun. 3, 2003

(54) BASEBAND INTERFERENCE CANCELING SPREAD SPECTRUM COMMUNICATIONS METHODS AND APPARATUS

(75) Inventors: Mohamed F. Madkour, Dallas, TX (US); Someshwar C. Gupta, Dallas, TX (US); Yi Pin Eric Wang, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/364,169

(22) Filed: Jul. 30, 1999

(51) Int. Cl.$^7$ .................... H04B 1/69; H04B 1/707

(52) U.S. Cl. .................. 375/148; 375/144; 375/346

(58) Field of Search ..................... 375/148, 144, 375/140, 141, 142, 147, 150, 346

(56) References Cited

U.S. PATENT DOCUMENTS

| | | | |
|---|---|---|---|
| 5,572,552 A | 11/1996 | Dent et al. | 375/343 |
| 5,615,209 A | 3/1997 | Bottomley | 370/342 |
| 5,673,291 A | 9/1997 | Dent | 375/262 |
| 5,787,130 A | 7/1998 | Kotzin et al. | 375/346 |
| 6,298,050 B1 * | 10/2001 | van Heeswyk et al. | 370/335 |

FOREIGN PATENT DOCUMENTS

| | | |
|---|---|---|
| EP | 0 676 874 A2 | 10/1995 |
| EP | 0 810 741 A2 | 12/1997 |
| EP | 0 884 855 A2 | 12/1998 |

OTHER PUBLICATIONS

International Search Report, PCT/US00/16550, Oct. 17, 2000.
Adachi et al., "Wideband DS–CDMA for Next–Generation Mobile Communications Systems," IEEE Communications Magazine, Sep., 1998, pp. 56–69.
Barbosa et al., "Adaptive Detection of DS/CDMA Signals in Fading Channels," IEEE Trans. Commun., vol. 46, pp. 115–124, Jan. 1998.
Bottomley et al., "Adaptive Arrays and MLSE Equalization," Proc. 1995 IEEE 45$^{th}$ Vehicular Technology Conference (VTC '95), Chicago, Jul. 25–28, 1995, 5 pgs.
Bottomley, "Optimizing the Rake Receiver for the CDMA Downlink," Proceedings of the 43$^{rd}$ IEEE Vehicular Technology Conference, Secaucus, NJ, May 18–20, 1993.

(List continued on next page.)

*Primary Examiner*—Stephen Chin
*Assistant Examiner*—David B. Lugo
(74) *Attorney, Agent, or Firm*—Myers Bigel Sibley & Sajovec

(57) ABSTRACT

Desired information is recovered from a communications signal that includes interference by processing the communications signal to produce a baseband signal and detecting a spreading sequence from the baseband signal. An estimate of an interfering signal component of the baseband signal associated with the detected spreading sequence is generated, and new version of the baseband signal is generated from a previous version of the baseband signal based on the generated estimate of the interfering signal component. The desired information is estimated from the new version of the baseband signal. The spreading sequence preferably is detected by resolving, e.g., descrambling, a version of the baseband signal into a plurality of signal components, respective ones of which are associated with respective propagation paths. The resolved plurality of signal components are correlated with a set of spreading sequences to generate respective sets of correlations for respective ones of the resolved signal components. The correlations are combined, preferably using maximal ratio combining (MRC) to generate a plurality of combined correlations, respective ones of which correspond to respective ones of the spreading sequences. The spreading sequence associated with the interfering signal component is detected from the generated combined correlations.

58 Claims, 14 Drawing Sheets

OTHER PUBLICATIONS

Dahlman et al., "UMTS/IMT-2000 Based on Wideband CDMA," IEEE Communications Magazine, Sep. 1998, pp. 70–80.

Davis et al., "A Noise Whitening Approach to Multiple-Access Noise Rejection-Part II: Implementation Issues," IEEE Journal on Selected Areas in Communications, vol. 14, Oct. 1996, pp. 1488–1499.

Dent et al., "CDMA-IC: A Novel Code Division Multiple Access Scheme Based on Interference Cancellation," in Proc. PIMRC, Boston, Massachusetts, pp. 4.1.1–4.1.5, Oct. 1992.

Dinan et al., "Spreading Codes for Direct Sequence CDMA and Wideband CDMA Cellular Networks," IEEE Communications Magazine, Sep. 1998, pp. 48–54.

Duel-Hallen et al., "Multiuser Detection of CDMA Systems," IEEE Personal Commun. Mag., vol. 2, pp. 46–58, Apr. 1995.

Ewerbring et al., "CDMA with Interference Cancellation: A Technique for High Capacity Wireless Systems," in Proc. IEEE Int. Conf. Commun., Geneva, Switzerland, 1993.

Gumas, "A Century Old, the Fast Hadamard Transform Proves Useful in Digital Communications," Personal Engineering, Nov. 1997, pp. 57–63.

Harris et al. "Handbook of Mathematics and Computer Science," published by Springer-Verlag, New York, 1998, pp. 456–457.

Hottinen et al., "Multi-User Detection for Multi-Rate CDMA Communications," in Proc. IEEE Int. Conf. Commun., Dallas, Texas, Jun. 24–28, 1996.

Jamal et al., "Adaptive MLSE Performance on the D-AMPS 1900 Channel," IEEE Transactions on Vehicular Technology, vol. 46, Aug. 1997, pp. 634–641.

Juntti, M.J., "Multi-User Detector Performance Comparisons in Multi-Rate CDMA Systems," in Proc. IEEE VTC '98, pp. 31–35, Ottawa, Canada, May 1998.

Juntti, M.J., "System Concept Comparisons for Multi-Rate CDMA with Multi-User Detection," in Proc. IEEE VTC '98, pp. 36–40, Ottawa, Canada, May 1998.

Klein, Data Detection Algorithms Specifically Designed for the Downlink of CDMA Mobile Radio Systems, 1997 IEEE Vehicular Technology Conference, Phoenix, AZ, May 4–7, 1997.

Kohno et al., "Combination of an Adaptive Array Antenna and a Canceller of Interference for Direct-Sequence Spread-Spectrum Multiple-Access System," IEEE Journal on Selected Areas in Communication, vol. 8, No. 4, May 1990.

Liu et al., "Blind Equalization in Antenna Array CDMA Systems," IEEE Trans. Sig. Proc., vol. 45, pp. 161–172, Jan. 1997.

Madhow et al., "MMSE Interference Suppression for Direct-Sequence Spread-Spectrum Communication," IEEE Trans. Commun., vol. 42, pp. 3178–3188, Dec. 1994.

Madkour et al., "Multi-Rate Multi-Code CDMA Using FWT For Mobile and Personal Communications," in Proceedings of The Ninth IEEE International Symposium on Personal, Indoor and Mobile Radio Communications, The Marriott Copley Place, Boston, Massachusetts, Sep. 8–11, 1998.

Mailaender et al., "Linear Single-User Detectors for Asynchronous and Quasi-Synchronous CDMA," in Proc. $29^{th}$ Annual Conf. on Info. Sciences and Systems (CISS '95), Johns Hopkins University, pp. 199–204, 1995.

Monk et al., "A Noise Whitening Approach to Multiple Access Noise Rejection-Part I: Theory and Background," IEEE Journal on Selected Areas in Communications, vol. 12, Jun. 1994, pp. 817–827.

Muszynski, P., "Interference Rejection Rake-Combining for WCDMA," First Intl. Symposium on Wireless Personal Multimedia Communications (WPMC '98), Yokosuka, Japan, pp. 93–98, Nov. 4–6, 1998.

Naguib et al., "Performance of CDMA Cellular Networks with Base-Station Antenna Arrays," Presented at the 1994 International Zurich Seminar on Digital Communications (no date).

Ng et al., "A Structured Channel Estimator for Maximum-Likelihood Sequence Detection," IEEE Commun. Letters, vol. 1, pp. 52–55, Mar. 1997.

Ojanpera et al., "Qualitative Comparison of Some Multi-User Detector Algorithms for Wideband CDMA," in Proc. IEEE VTC '98, pp. 46–50, Ottawa, Canada, May 1998.

Patel et al., "Analysis of a DS/CDMA Successive Interference Cancellation Scheme in DS/CDMA System Using Correlations," in Proc. Globecom, Houston, Texas, pp. 76–80, 1993.

Patel et al., "Analysis of a Simple Successive Interference Cancellation Scheme in DS/CDMA System," IEEE JSAC, vol. 12, No. 5, pp. 796–807, Jun. 1994.

Pateros et al., "An Adaptive Correlator Receiver for Direct-Sequence-Spread-Spectrum Communication," IEEE Trans. Commun., vol. 44, pp. 1543–1552, Nov. 1996.

Peterson et al., "Introduction to Spread-Spectrum Communications," Prentice Hall International, Inc., pp. 540–547, 1995.

Picinbono, B., "On Circularity," IEEE Trans. Sig. Proc., vol. 42, pp. 3473–3482, Dec. 1994.

Picinbono, B., "Second-Order Complex Random Vectors and Normal Distributions," IEEE Trans. Sig. Proc., vol. 44, pp. 2637–2640, Oct. 1996.

Wang et al., "Blind Multi-User Detection: A Subspace Approach," IEEE Trans. Info. Theory, vol. 44, No. 2, pp. 677–690, Mar. 1998.

Yoon et al., "A Spread-Spectrum Multiaccess System with Cochannel Interference Cancellation for Multipath Fading Channels," IEEE J. Select. Areas Commun., vol. 11, No. 7, pp. 1067–1075, Sep. 1993.

Yoon et al., "Matched Filtering in Improper Complex Noise and Applications to DS-CMDA," Sixth IEEE Intl. Symp. Personal, Indoor, Mobile Radio Commun. (PIMRC '95), Toronto, Sep. 27–29, 1995.

Yoon et al., "Matched Filters with Interference Suppression Capabilities for DS-CDMA," IEEE J. Sel. Areas Commun., vol. 14, pp. 1510–5121, Oct. 1996.

Yoon et al., "Maximizing SNR in Improper Complex Noise and Applications to CDMA," IEEE Commun. Letters, vol. 1, pp. 5–8, Jan. 1997.

Zvonar et al., "Sub-Optimal Multi-User Detector for Frequency Selective Rayleigh Fading Synchronous CDMA Channels," IEEE Trans. Commun., vol. 43, No. 2/3/4, pp. 154–157, Feb./Mar./Apr. 1995.

* cited by examiner

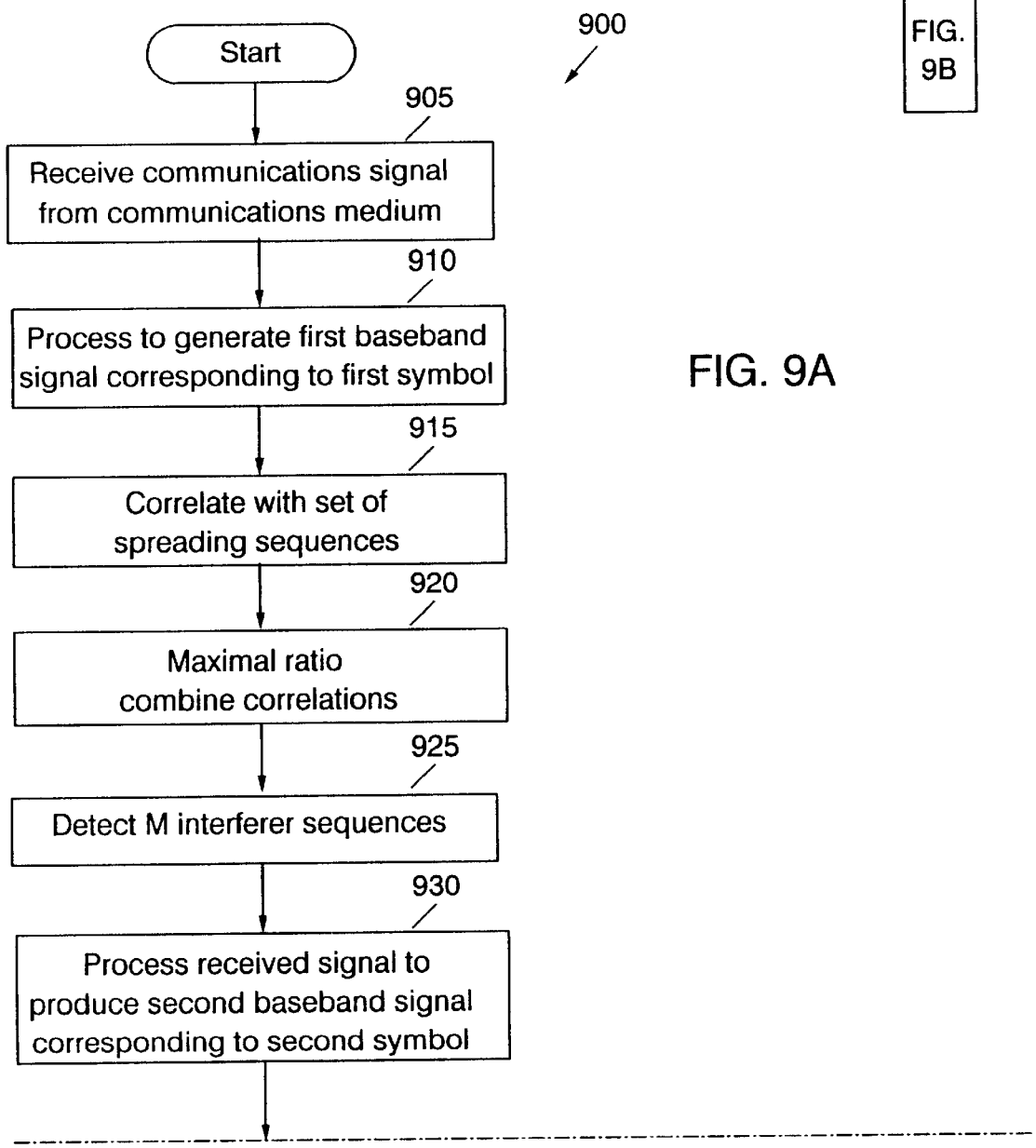

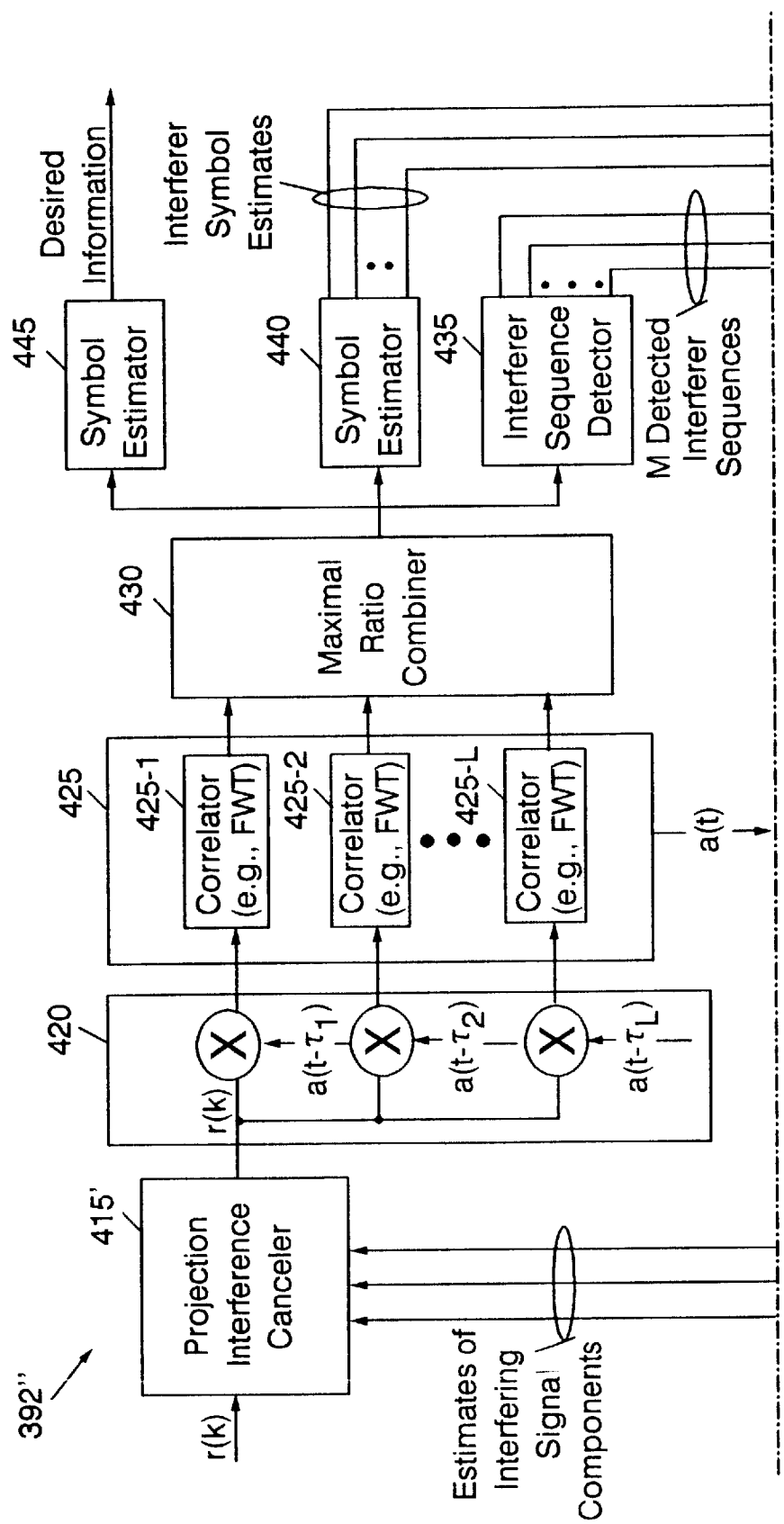

BASEBAND INTERFERENCE CANCELING SPREAD SPECTRUM COMMUNICATIONS METHODS AND APPARATUS

CROSS-REFERENCE TO RELATED APPLICATION

This application is related to application Ser. No. 09/235,470 to Wang et al., filed Jan. 22, 1999, assigned to the assignee of the present application. The disclosure of this application is hereby incorporated herein by reference.

FIELD OF THE INVENTION

The present invention relates to communications methods and apparatus, and more particularly, to spread spectrum communications methods arid apparatus.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication for a cell 24. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity.

Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple-channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i. e., a code that spreads an original data-modulated carrier over a wide portion of the frequency spectrum in which the communications system operates.

Conventional spread-spectrum CDMA communications systems commonly use "direct sequence" spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

In a typical CDMA system, a data stream intended for a particular user (terminal) is first direct-sequence spread according to a user-specific spreading sequence, and the resultant signal is then scrambled according to a cell-specific scrambling sequence. The spread and scrambled user data stream is then transmitted in a communications medium. Spread-spectrum signals for multiple users generally combined to form composite signal in the communications medium.

Downlink signals for different physical channels within a cell are typically transmitted from a base station in a synchronous fashion. The user-specific spreading codes are typically orthogonal, creating mutually orthogonal downlink signals at the transmitter. However, channel dispersion typically results in a loss of orthogonality at the receiver, giving rise to intra-cell multi-user interference that can lead to degradation of receiver performance. This interference can be exacerbated by the "near-far" problem, i.e., the higher contribution of signal energy from interferers that are closer to the receiver than the station transmitting a desired signal. Although the near-far problem can be alleviated by power control techniques on the uplink, power control is generally impractical on the downlink.

These problems may be exacerbated in "third generation" systems such as wideband CDMA (WCDMA) systems. Such systems typically are intended to support several kinds of communications services, including voice and data applications that have varying information rate requirements. Generally, these systems are designed to support higher data rates than their predecessors, and also are designed to support a wide variety of data rates. However, the higher data rates and increased bandwidth of such wideband systems can combine to cause severe inter-cell and intra-cell interference among users. Such wideband third-generation systems are typically designed to support multiple spreading factors, which means that signals with low spreading factors generally require higher transmit power to achieve the same link quality as signals transmitted using higher spreading factors. This power differential can further increase intra-cell multiuser interference.

Several techniques for canceling such interference have been proposed, but many of these are more suitable for uplink interference cancellation, i.e., are highly complex and/or presuppose a priori knowledge of the spreading sequences being used in the system. Although such techniques can provide effective interference cancellation, in the presence of increasing demand for wireless services there is an ongoing need for interference cancellation techniques to further improve resource utilization.

SUMMARY OF THE INVENTION

In light of the foregoing, it is an object of the present invention to provide methods and apparatus for recovering information in composite spread spectrum signals transmitted in a communications medium.

It is another object of the present invention to provide methods and apparatus for recovering information transmitted according to a spreading code in the presence of interference from other spread spectrum signals.

It is a further object of the present invention to provide methods and apparatus for recovering a selected user signal in a cellular CDMA system in the presence of intra-cell multiuser interference.

These and other objects, features and advantages may be provided, according to the present invention, by methods and apparatus in which a baseband signal is recursively modified based on an estimate of interfering signal components constructed from spreading sequences detected in the baseband signal. More particularly, in embodiments according to the present invention, the baseband signal is descrambled to into multipath components that are correlated with a set of spreading sequences, for example, a set of possible spreading sequences used in a wireless CDMA communications system, yielding sets of correlations that are maximal ratio combined (MRC) to detect spreading sequences associated with interfering signal components in the baseband signal. Associated symbol estimates may be generated from the MRC results, and processed according to the detected spreading code, scrambling code and a channel estimate to generate an estimate of the interfering signal component. The estimate of the interfering signal component may then be used to cancel interference in the baseband signal using, for example, subtraction or signal projection techniques.

In one embodiment according to the present invention, desired information is recovered from a communications signal that includes interference by processing the communications signal to produce a baseband signal and detecting a spreading sequence from the baseband signal. An estimate of an interfering signal component of the baseband signal associated with the detected spreading sequence is detected. A new version of the baseband signal is generated from a previous version of the baseband signal based on the generated estimate of the interfering signal component. The desired information is estimated from the new version of the baseband signal.

The spreading sequence preferably is detected by resolving, e.g., descrambling, a version of the baseband signal into a plurality of signal components, respective ones of which are associated with respective propagation paths. The resolved plurality of signal components are correlated with a set of spreading sequences to generate respective sets of correlations for respective ones of the resolved signal components. The correlations are combined, preferably using MRC, to generate a plurality of combined correlations, respective ones of which correspond to respective ones of the spreading sequences. The spreading sequence associated with the interfering signal component is detected from the generated combined correlations. For example, the detected spreading sequence may be the sequence having the highest energy as indicated by the combined correlations, indicating that the interfering signal component associated with the detected signal has the highest signal strength in comparison with other interferers in the baseband signal.

The estimate of the interfering signal component preferably is generated by generating an estimate of a symbol transmitted according to the detected spreading sequence from the combined correlation associated with the detected spreading sequence. The estimate of the symbol is then processed according to the detected spreading sequence, the scrambling sequence and a channel estimate to generate an estimate of the interfering signal component.

According to another embodiment of the present invention, a plurality of spreading sequences are detected from the resolved plurality of signal components, respective ones of the detected plurality of spreading sequences being associated with respective ones of a plurality of interfering signal components in the communications signal. An estimate of the interfering signal component is then generated by generating respective estimates of symbols encoded according to respective ones of the detected spreading sequences from the combined correlations associated with the detected spreading sequences. Respective ones of the estimates of the encoded symbols are spread according to respective corresponding spreading sequences, and the spread estimates of the encoded symbols are combined to generate a composite signal. The composite signal is scrambled according to the scrambling sequence and processed according to a channel estimate to generate a composite estimate of the plurality of interfering signal components. A new version of the baseband signal is generated from a previous version of the baseband signal and the generated composite estimate of the plurality of interfering signal components. The new version of the baseband signal may be generated, for example, by subtracting the estimate of the interfering signal component from the previous version of the baseband signal to generate the new version of the baseband signal, or by determining a projection of the previous version of the baseband signal in a direction in signal space orthogonal to the estimate of the interfering signal component.

According to a "subspace cancellation" aspect of the present invention, respective ones of the estimates of the encoded symbols are spread according to respective corresponding spreading sequences. The spread estimates of the encoded symbols are then scrambled separately according to the scrambling sequence to generate a plurality of scrambled spread signals. The scrambled spread signals are then separately processed according to the channel estimate to generate respective estimates of respective ones of the plurality of interfering signal components. A new version of the baseband signal is generated from a previous version of the baseband signal and the generated estimates of the plurality of interfering signal components, preferably by determining a projection of the previous version of the baseband signal in a direction in signal space orthogonal to the generated estimates of the plurality of interfering signal components. The projection may be determined using, for example, a Gram-Schmidt orthogonalization.

According to another aspect of the present invention, the recursively generated baseband signal may be used to estimate desired information in the baseband signal using similar techniques to those used to generate the estimates of interfering signal components. The new version of the baseband signal is resolved into a plurality of interference-canceled signal components, and the resolved plurality of interference-canceled signal components correlated with a desired spreading sequence to generate a set of correlations for the resolved signal components. The correlations are then combined and the desired information estimated from the combined correlations.

According to yet another embodiment of the present invention, spreading sequences are detected for selected symbol periods, and used to generate estimates of interfering signal components for other symbol periods. A spreading sequence is detected from a first portion of the baseband signal corresponding to a first transmitted symbol. An estimate of an interfering signal component is generated from a second portion of the baseband signal associated with a second transmitted symbol based on the detected spreading sequence. A new version of the second portion of the baseband signal is estimated from a previous version of the second portion of the baseband signal and the generated estimate of the interfering signal component, and the second transmitted symbol is estimated from the new version of the second portion of the baseband signal.

According to yet another aspect of the present invention, an apparatus for recovering information from a communications signal comprises means for processing the communications signal to produce a baseband signal. Means for detecting a spreading sequence from the baseband signal are provided, along with means for generating an estimate of an interfering signal component of the baseband signal associated with the detected spreading sequence. Means are also provided, responsive to the means for generating an estimate of an interfering signal component, for generating a new version of the baseband signal from a previous version of the baseband signal based on the generated estimate of the interfering signal component. In addition, means are provided, responsive to the means for generating a new version of the baseband signal, for estimating the desired information from the new version of the baseband signal.

According to another aspect of the present invention, a receiver includes a recursive baseband processor that detects a spreading sequence from the baseband signal, generates an estimate of an interfering signal component of the baseband signal associated with the detected spreading sequence, generates an interference-canceled version of the baseband signal from the baseband signal based on correlations of the baseband signal with a set of spreading sequences, and generates an estimate the desired information from the interference-canceled version of the baseband signal. The baseband processor preferably includes a descrambler operative to resolve a version of the baseband signal into a plurality of multipath signal components. A correlator is responsive to the descrambler, correlating the resolved plurality of multipath signal components with a set of spreading sequences to generate respective sets of correlations for respective ones of the resolved signal components. A maximal ratio combiner is responsive to the correlator and operative to combine correlations to generate a plurality of combined correlations, respective ones of which correspond to respective ones of the spreading sequences.

A spreading sequence detector is responsive to the maximal ratio combiner and operative to detect the spreading sequence associated with the interfering signal component from the generated combined correlation. A symbol estimator is also responsive to the maximal ratio combiner and operative to generate a symbol estimate for the interfering signal component. A spreader is responsive to the spreading sequence detector and to the symbol estimator, and spreads the generated symbol estimate according to the detected spreading sequence. A scrambler is responsive to the spreader and operative to scramble the spread symbol estimate according to the scrambling sequence. A channel emulator is responsive to the scrambler and operative to process the scrambled spread symbol estimate according to a channel estimate to generate an estimate of the interfering signal component. A baseband interference canceler is responsive to the channel emulator, generating a new version of the baseband signal from a previous version of the baseband signal and the generated estimate of the interfering signal component.

In another embodiment according to the present invention, the descrambler is further operative to resolve the new version of the baseband signal into a plurality of signal components, respective ones of which are associated with respective propagation paths. The correlator is further operative to correlate the resolved plurality of signal components of the new version of the baseband signal with a desired spreading sequence to generate a set of correlations for the resolved signal components of the new version of the baseband signal. The maximal ratio combiner is further operative to combine the set of correlations for the resolved signal components of the new version of the baseband signal to generate a decision statistic for a symbol transmitted according to the desired spreading sequence. The receiver further comprises a symbol estimator responsive to the maximal ratio combiner and operative to generate an estimate of a symbol transmitted according to the desired spreading sequence from the generated decision statistic.

DETAILED DESCRIPTION OF PREFERRED EMBODIMENTS

Figure 1:
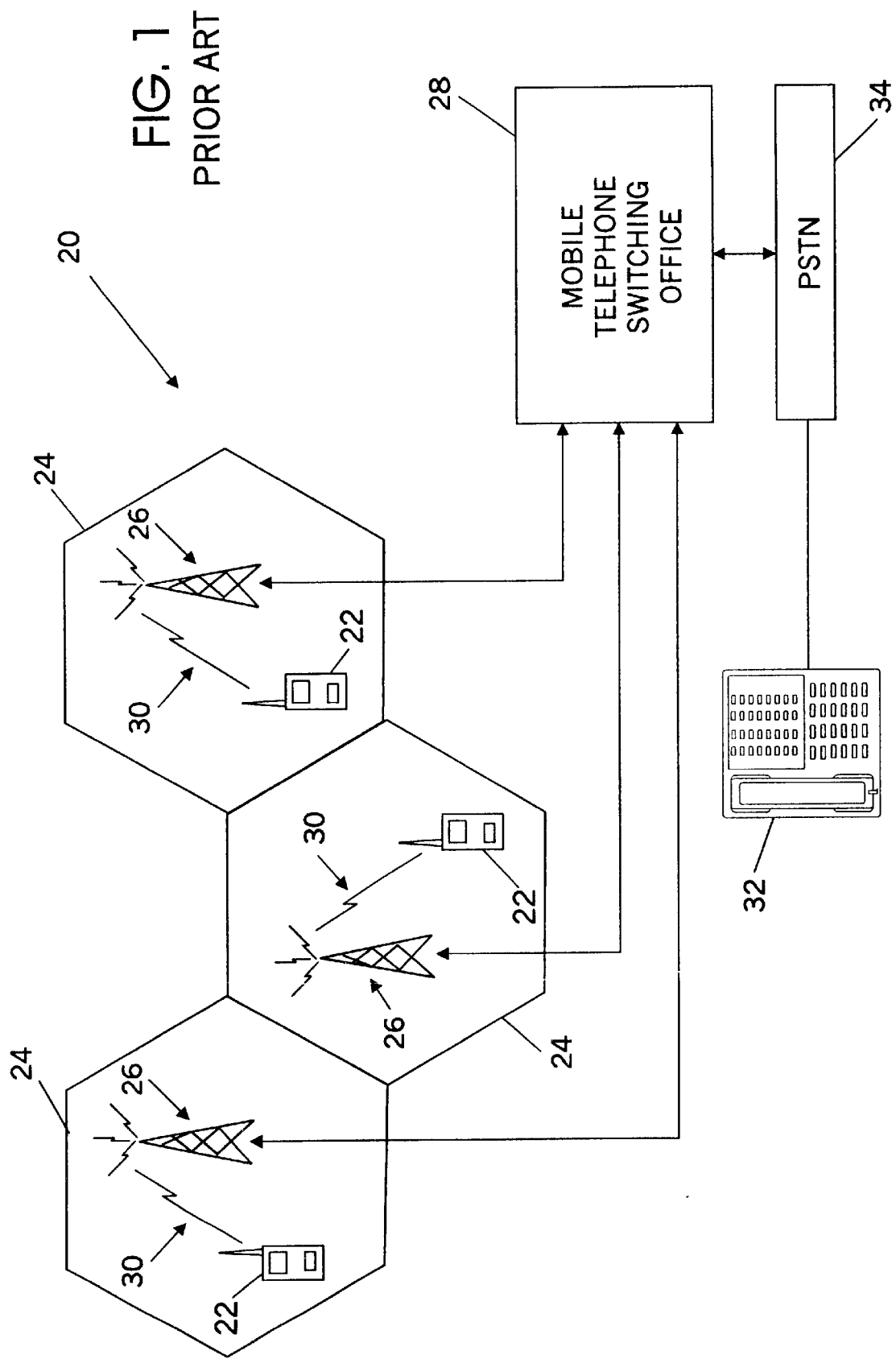
FIG. 1 is a schematic diagram illustrating a conventional terrestrial cellular communications system.
Figure 2:
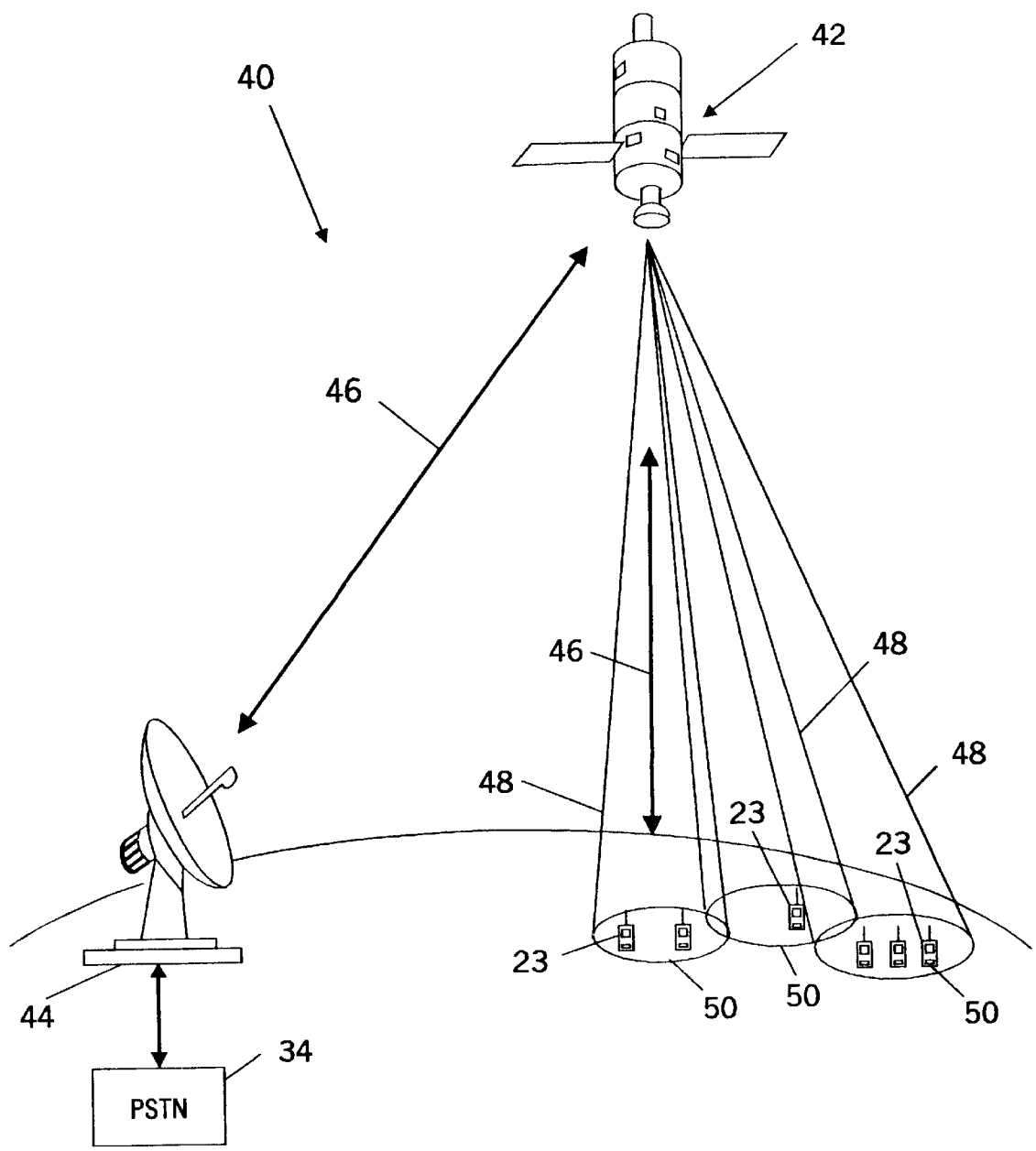
FIG. 2 is a schematic diagram illustrating a conventional satellite based wireless communications system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The discussion herein relates to wireless communications systems, and more particularly, to wireless code division multiple access (CDMA) systems, for example, systems conforming to the IS-95 standards or to proposed standards for third-generation wideband CDMA (WCDMA, IS-2000, and the like). In such wireless communications systems, an antenna radiates electromagnetic waveforms generated by a transmitter located, for example, in a mobile terminal or base station. The waveforms are propagated in a radio propagation environment, and are received by a receiver via one or more antennas. It will be understood that, although the description herein refers to a radio environment, the present invention is applicable to other environments, such as wireline communications.

The exemplary embodiments described herein also are preferably applied to interference cancellation for a wireless downlink channel, i.e., a channel conveying information from a base station of a wireless cellular system to a terminal, and to apparatus and methods that may be implemented in a wireless communications terminal, for example, a cellular radiotelephone, wireless capable personal digital assistant (PDA) or similar wireless communications device. It will be appreciated, however, that the present invention may be used in other environments, e.g., in other types of wireless receiver applications or in wireline receiver applications.

FIGS. 5–7, 9 and 11 described herein are flowchart illustrations of exemplary operations according to various embodiments of the present invention. It will be understood that blocks of these flowcharts, and combinations of blocks in these flowcharts, can be implemented by computer program instructions which may be loaded and executed on a computer or other programmable data processing apparatus, such as a microcomputer, microprocessor, ASIC, DSP chip or other processing circuitry used to implement apparatus, such as the receiver apparatus described herein with reference to FIGS. 4, 8 and 10, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts of FIGS. 5–7, 9 and 11 support combinations of means for performing the specified functions and combinations of steps for performing the specified functions. It will also be understood that each block of the flowcharts of FIGS. 5–7, 9 and 11, and combinations of blocks therein, can be implemented by special purpose hardware-based computer systems which perform the specified functions or steps, or combinations of special purpose hardware and computer instructions.

Figure 3:
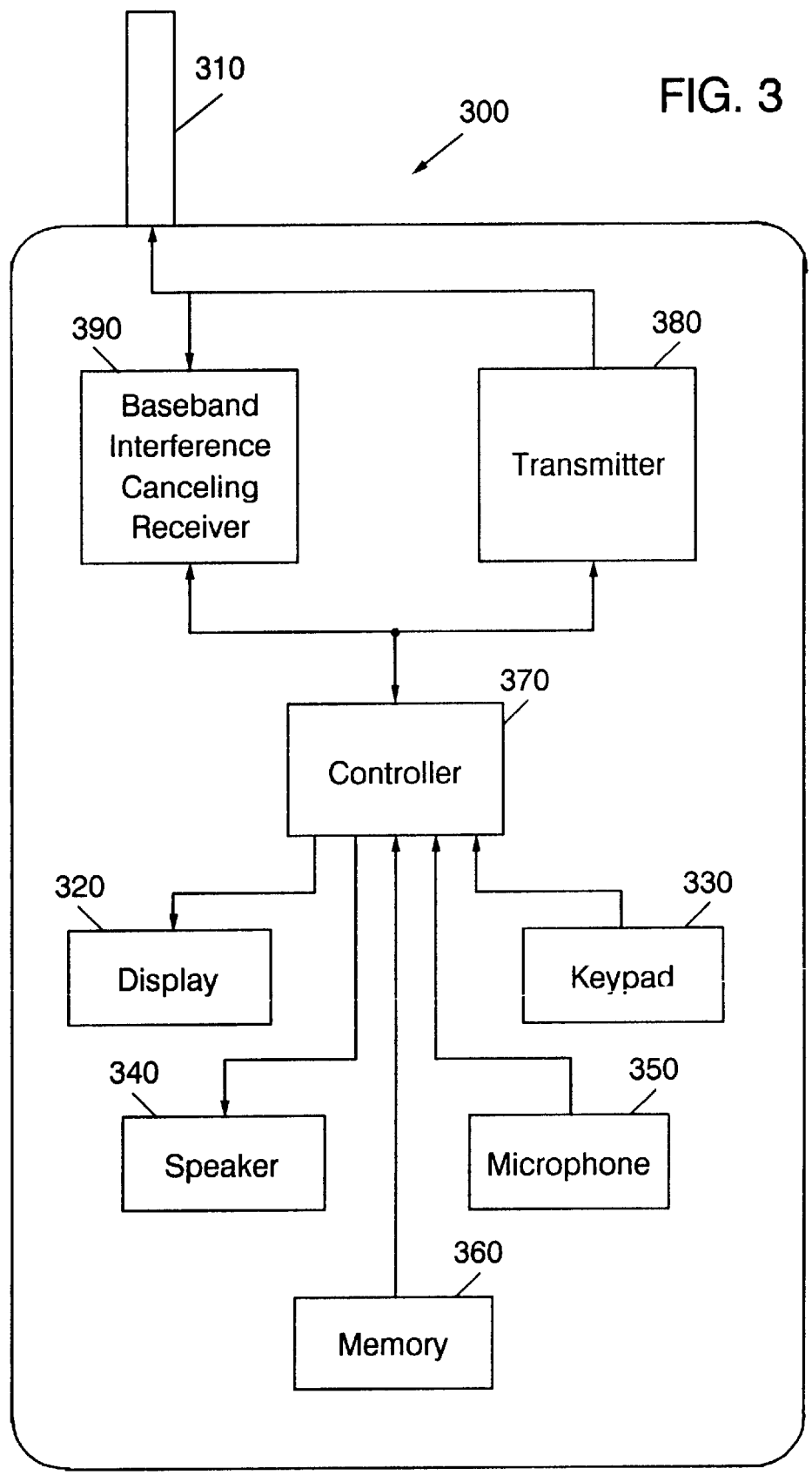
FIG. 3 is a schematic diagram illustrating a wireless terminal in which apparatus and methods according to the present invention can be implemented.

FIG. 3 illustrates an exemplary wireless terminal 300 in which methods and apparatus according to the present invention may be embodied. The terminal 300 includes a controller 370, such as a microprocessor, microcontroller or similar data processing device, that executes program instructions stored in a memory 360, such as a dynamic random access memory (DRAM), electrically erasable programmable read only memory (EEPROM) or other storage device. The controller 370 is operatively associated with user interface components such as a display 320, keypad 330, speaker 340, and microphone 350, operations of which are known to those of skill in the art and will not be further discussed herein. The controller 370 also controls and/or monitors operations of a radio transmitter 380 that, for example, transmits radio frequency (RF) signals in a communications medium via an antenna 310. The controller 470 is also operatively associated with a baseband interference canceling receiver 390, exemplary operations of which are described in detail below.

Figure 4:
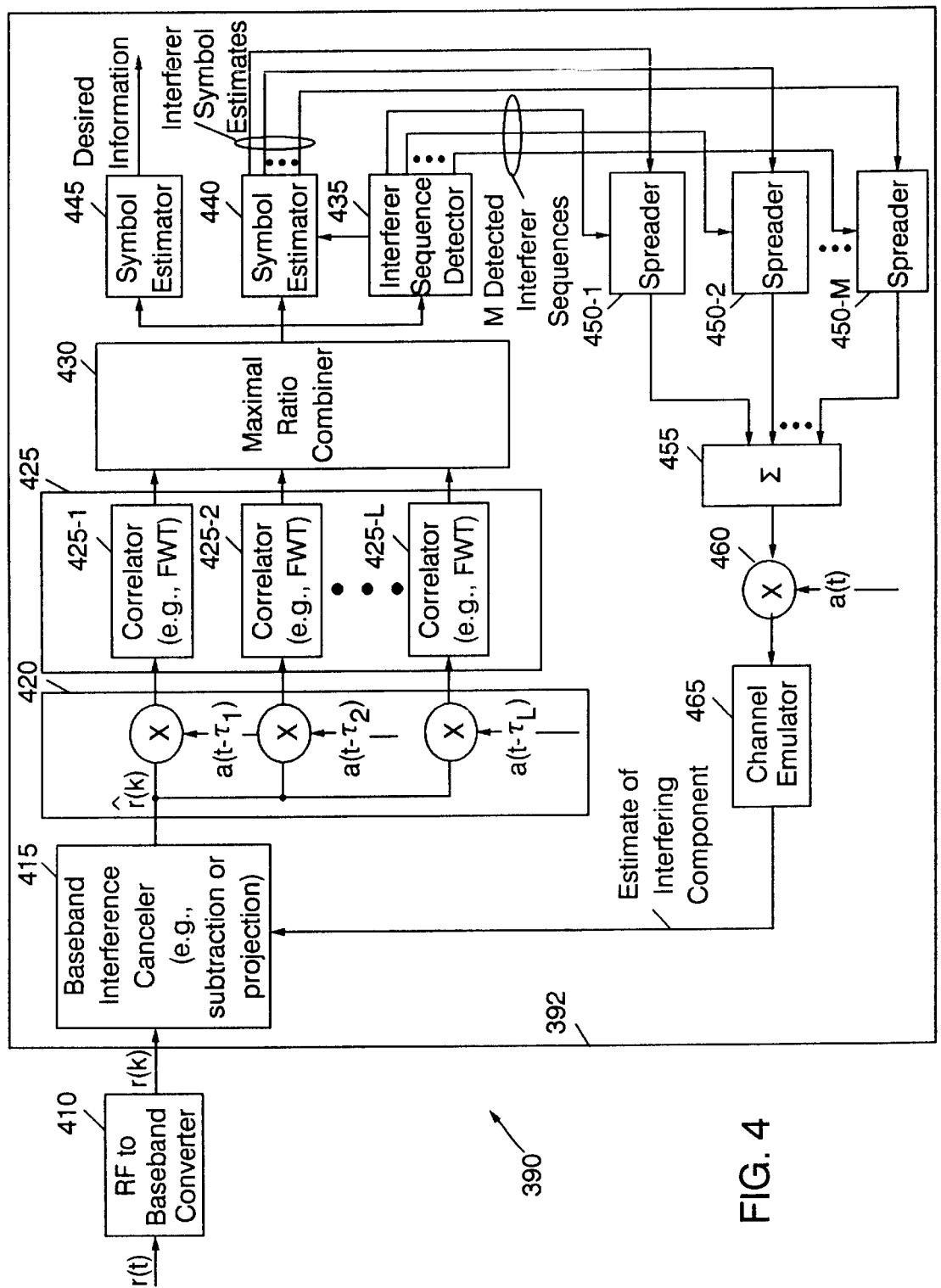
FIG. 4 is a schematic diagram illustrating a baseband interference canceling receiver according to an embodiment of the present invention.

FIG. 4 illustrates an exemplary embodiment of a baseband interference canceling receiver 390 according to one embodiment of the present invention. The baseband interference canceling receiver 390 processes a received radio communications signal r(t), for example, a signal received from over a wireless link by an antenna such as the antenna 310 of FIG. 3, that includes components associated with multiple transmitted spread spectrum signals intended for multiple users. The baseband interference canceling receiver 390 includes an RF to baseband converter 410 that processes the received communications signal r(t) to produce a baseband signal r(k), preferably a sequence of baseband samples. A recursive baseband processor 392 includes a baseband interference canceler 415 that buffers the baseband signal r(k) and iteratively modifies it, recursively producing one or more interference-canceled versions r̂(k) of the baseband signal r(k), final version of which is used to generate an estimate of information transmitted according to a desired spreading sequence, e.g., the spreading sequence assigned to a terminal, such as the terminal 300 of FIG. 3, in which the receiver 390 is located.

In a first pass in the recursive baseband processor 392, the baseband signal r(k) is passed unmodified through the baseband interference canceler, such that the output r̂(k) of the baseband interference canceler 415 is the same as the original baseband signal r(k). A descrambler 420 descrambles the output $\hat{r}(k)$ of the baseband interference canceler 415, resolving it into a plurality of multipath components, respective ones of which correspond to respective signal paths. As shown, this is achieved by correlating the baseband signal $\hat{r}(k)$ with time-shifted versions $a(t-\tau_1)$, $a(t-\tau_2), \ldots, a(t-\tau_L)$ of a scrambling sequence $a(t)$. However, it will be appreciated by those skilled in the art that resolution of the baseband signal $\hat{r}(k)$ into multipath components may be achieved by other techniques, such as by correlating the scrambling sequence $a(t)$ with time-shifted versions of the baseband signal $\hat{r}(k)$.

A correlator 425 correlates each of the multipath signal components with each of a set of spreading codes, e.g., the set of spreading codes that may be used at any given time in the wireless communications system. In embodiments in which the spreading sequences make up a Walsh-Hadamard code, the correlator 425 preferably includes a bank of fast Walsh transformers (FWTs) 425-1, 425-2, . . . 425-L to increase computational efficiency. However, it will be appreciated that other correlator strictures may be used with the present invention, such as correlators that include banks of correlators performing the functions of the FWTs.

The correlations produced by the correlator 425 are combined, preferably by a maximal ratio combiner (MRC) 430, producing respective combined correlations corresponding to respective ones of the set of spreading sequences. From these combined correlations, an interferer sequence detector 435 detects M spreading sequences associated with M interfering components in the baseband signal r(k). For example, the interferer sequence detector may detect M spreading sequences having associated combined correlations having the greatest energy, or M spreading sequences having associated energies exceeding a predetermined threshold. Such interferer spreading sequence detection techniques are described in U.S. patent application Ser. No. 09/235,470 to Wang et al., filed Jan. 22, 1999, assigned to the assignee of the present application, and incorporated herein by reference in its entirety.

Responsive to the interferer sequence detector 435, a symbol estimator 440 generates respective symbol estimates for symbols encoded according to respective ones of the detected M interferer sequences from the combined correlations of the MRC 430. The symbol estimates for the M interferers are then passed to signal spreaders 450-1, 450-2, . . . , 450-M, that spread respective ones of the symbol estimates according to respective ones of the corresponding interferer sequences. The resultant spread signals are then summed by a summer 455 to produce a composite spread signal. The composite signal produced by the summer 455 is then rescrambled according to the scrambling sequence $a(t)$ by a scrambler 460 and processed by a channel emulator 465 according to a channel estimate to generate an estimate of an interfering component in the baseband signal r(k).

Still in the first pass, a baseband interference canceler 415 modifies the original baseband signal r(k) based on the estimate of the interfering signal component, generating a new, interference-canceled version $\hat{r}(k)$ of the baseband signal. In a subsequent second pass, this new version $\hat{r}(k)$ of the baseband signal may be processed in a manner similar to the original baseband signal r(k), i.e., the new version $\hat{r}(k)$ of the baseband signal is subjected to descrambling in the descrambler 420, correlation with the set of spreading sequences in correlator 425, and maximal ratio combining in the combiner 430. If an iteration criterion is satisfied, the combined correlations produced by the MRC 430 from the baseband signal $\hat{r}(k)$ are used by another symbol estimator 445 to generate an estimate of desired transmitted information, i.e., the information transmitted according to the desired spreading sequence associated with the receiver 390. If the iteration criterion is not satisfied, the combined correlations produced from the current version of the baseband signal $\hat{r}(k)$ are used to generate new estimates of interfering signal components and, ultimately, a new version of the baseband signal $\hat{r}(k)$, in the manner described above.

A variety of iteration schemes can be used. For example, an error-controlled approach may be used in which the recursive baseband processor 392 generates a provisional estimate of the desired information from the combined correlations, and determines whether to perform another round of interference cancellation based on whether the provisional estimate meets a predetermined error criterion. Other constraints may be used in place of or in addition to an error criterion, such as a maximum iteration count criterion. The recursive baseband processor 392 may be constrained to cancel one interfering signal component per iteration, or may cancel multiple interfering components per iteration, e.g., on a two-at-a-time, three-at-a-time or greater rate.

The baseband interference canceler 415 may use a number of different techniques to modify the current version of the baseband signal based on the estimate of the interfering signal component. For example, the estimate of the interfering signal component may be subtracted from the current version of the baseband signal, or a projection technique may be employed wherein the baseband interference canceler 415 determines a projection of the current baseband signal in a direction orthogonal to the estimate of the interfering signal component. Gram-Schmidt orthogonalization techniques may be used to compute such a projection, in a manner similar to that described in U.S. Pat. No. 5,615,209 to Bottomley (filed Jul. 26, 1995 and issued Mar. 25, 1997), the disclosure of which is incorporated herein by reference in its entirety.

For the subtraction technique, limited simulations conducted by the inventors indicate that it is preferable to cancel a few interferers at each iteration to avoid an "over-cancellation" phenomenon. Generally, the projection technique may be more complex than the subtraction technique, but the simulation results indicate that it can produce improved performance (e.g., an increase in potential system capacity for a given error rate or a decrease in error rate for a given system capacity) and reduced likelihood of over-cancellation. Using the projection technique, the total number of iterations and the number of interferers canceled at a time can be varied to affect performance.

It will be understood that the baseband interference canceling receiver 390 of FIG. 4 may, in general, be implemented using a variety of hardware and/or software components. For example, the downconverter 410 may use a number of different commonly known communications components, such as demodulators, mixers, filters, and analog-to-digital (A/D) converters. It will be appreciated that, in general, such components may be implemented using hardware such as discrete circuit components, hybrid circuits and application-specific integrated circuits (ASICs), and/or combinations of such hardware and software or firmware configured to execute on special-purpose processing devices or general-purpose processing devices such as microprocessors, microcontrollers and digital signal processor (DSP) chips. The recursive baseband processor 392 may similarly be implemented using special-purpose hardware such as gate arrays or ASICs, software or firmware executing on special purpose processing devices or on general purpose processing devices such as microprocessors, microcontrollers or DSP chips, or combinations thereof.

Figure 5:
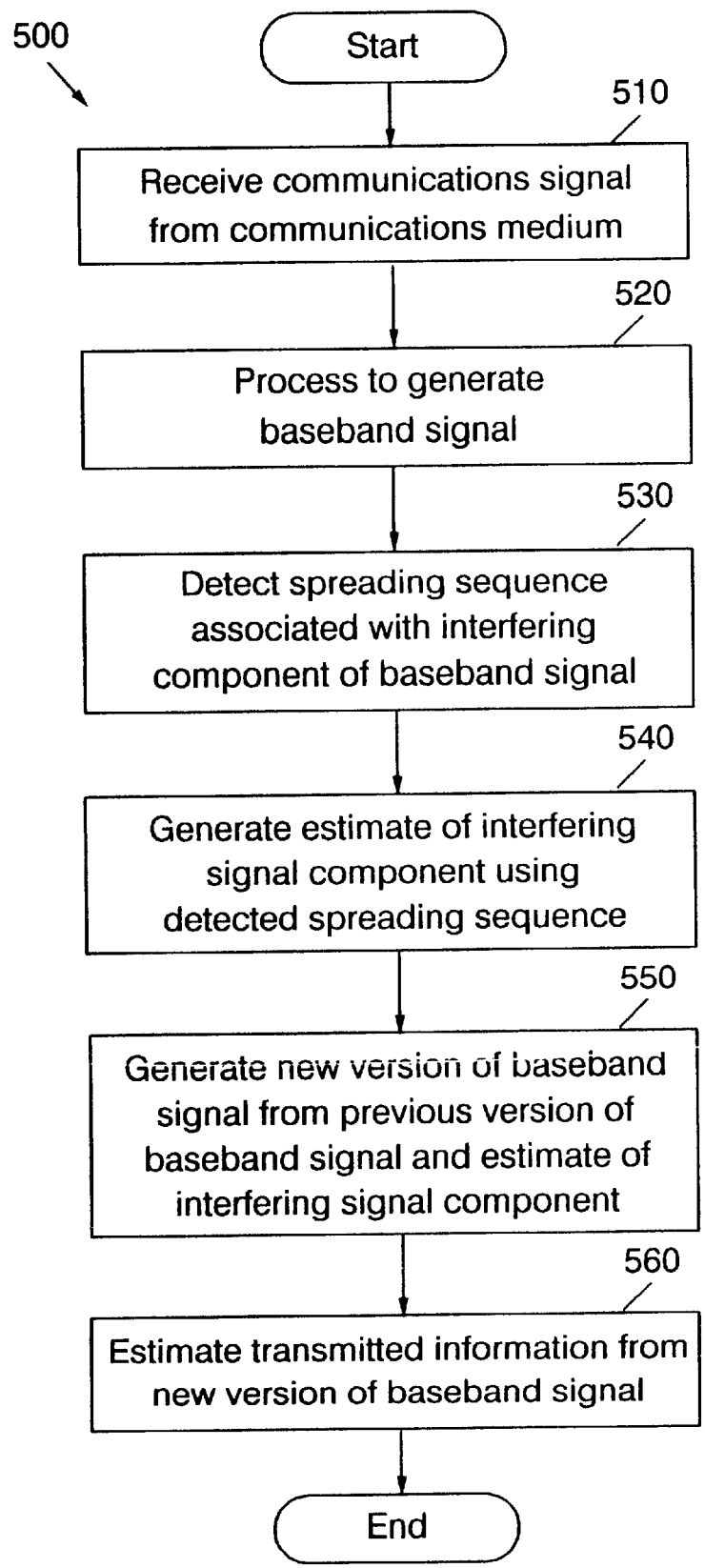
FIGS. 5–7 are flowcharts illustrating exemplary operations for baseband interference cancellation according to embodiments of the present invention.

FIG. 5 illustrates exemplary operations 500 for baseband interference cancellation in a receiver apparatus, such as the receiver 390 illustrated in FIG. 4, according to an embodiment of the present invention. A communications signal, such as a composite signal including interfering components associated with multiple spreading sequences, is received from a communications medium (Block 510). The received signal is then processed to generate a baseband signal (Block 520). A spreading sequence associated with an interfering component of the baseband signal is then detected from the baseband signal (Block 530), and an estimate of the interfering component is generated from the detected sequence (Block 540). A new version of the baseband signal is then generated from the previous version of the baseband signal and the estimate of the interfering signal component (Block 550). The new version of the baseband signal is then used to generate an estimate of transmitted information (Block 560).

Figure 6:
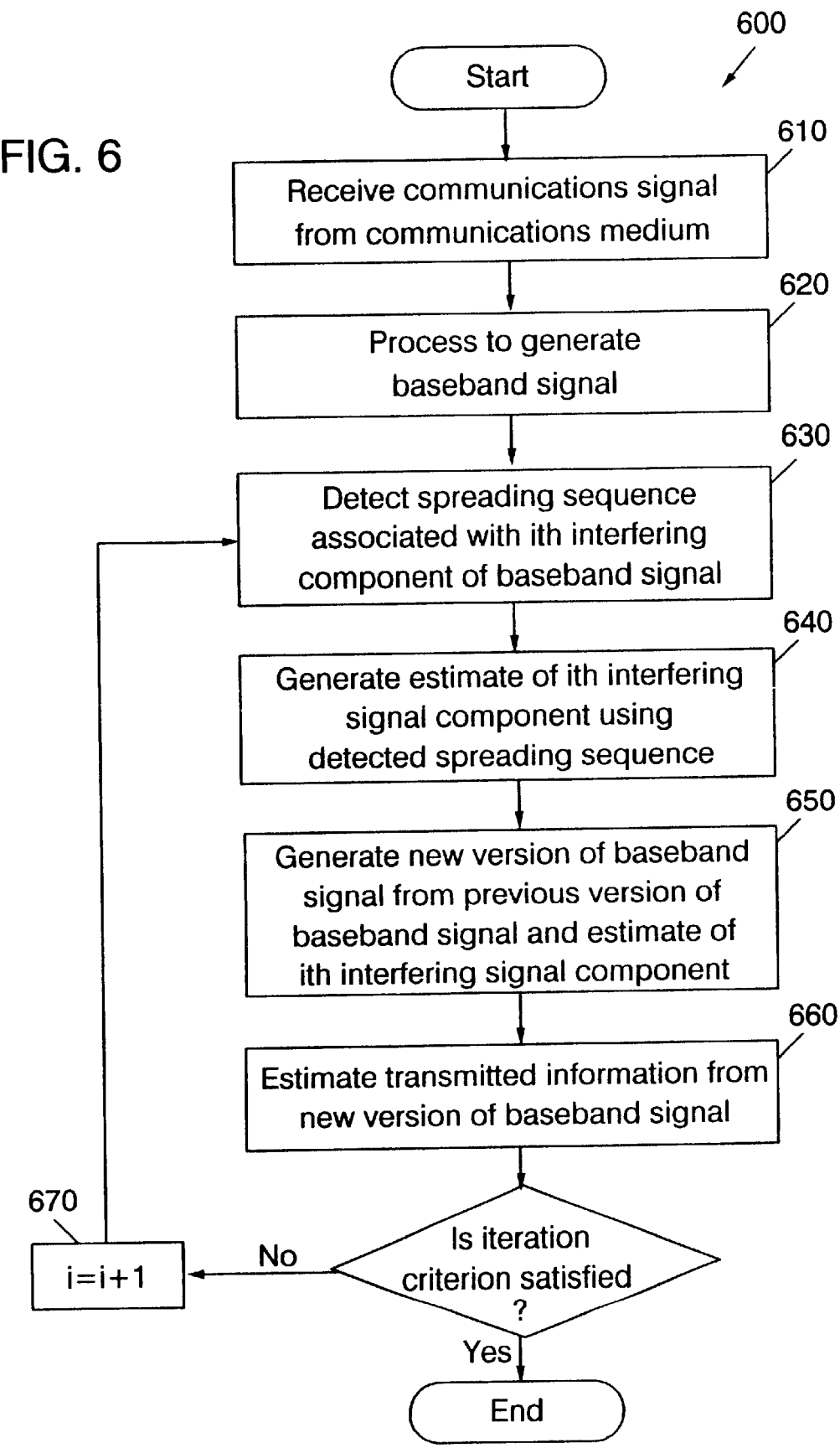

FIG. 6 illustrates exemplary operations for baseband interference cancellation according to another embodiment of the present invention, in particular, exemplary operations for iterative cancellation of a plurality of interfering signal components on a component-by-component basis. A communications signal is received from a communications medium (Block 610) and processed to generate a baseband signal (Block 620). A spreading sequence associated with an ith interfering signal component is detected (Block 630), and used to generate an estimate of the ith interfering signal component (Block 640). A new version of the baseband signal is then generated from the previous version of the baseband signal and the estimate of the interfering signal component, for example, by subtraction or projection (Block 650). Transmitted information is then estimated from the new version of the baseband signal (Block 660). If the estimate meets a predetermined error criterion, such as a bit error rate, interference cancellation operations are complete. However, if the estimate fails to the meet the predetermined error criterion, an (i+1)th interfering signal component is estimated and used to generate yet another new version of the baseband signal (Blocks 670, 630–660).

Figure 7:
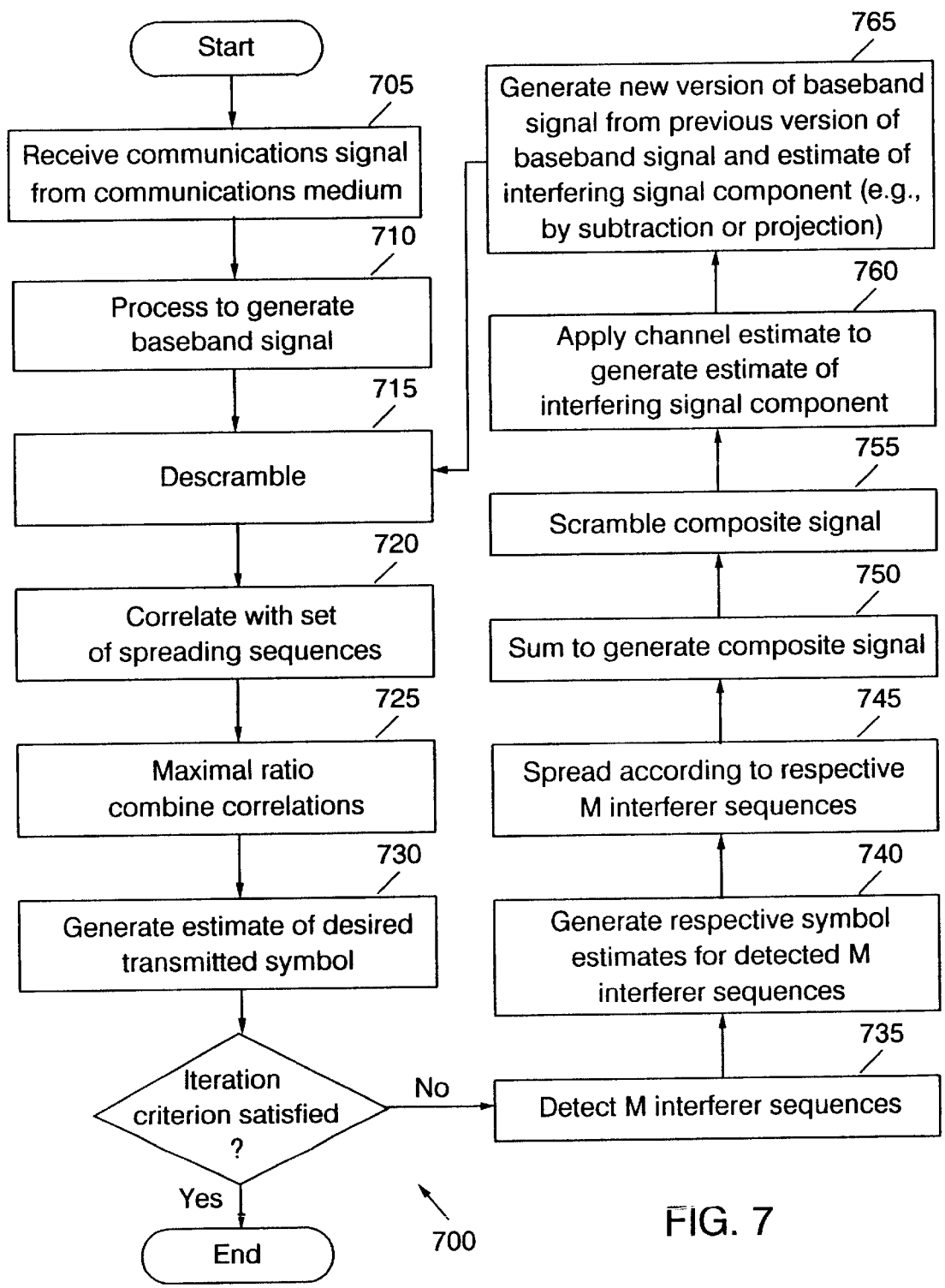

FIG. 7 illustrates exemplary interference cancellation operations 700 according to yet another embodiment of the present invention, more particularly, operations for generating an estimate of a composite interfering signal component that reflects interference associated with multiple interfering sequences. A communications signal is received (Block 705), and processed to produce a baseband signal (Block 710). The baseband signal is descrambled (Block 715), and correlated with a set of spreading sequences (Block 720). The correlations thus produced are then maximal ratio combined (Block 725), and an estimate of information transmitted according to a desired sequence is generated from the combined correlations (Block 730). If a predetermined iteration criterion (for example, an iteration count and/or an error criterion such as bit error rate) is satisfied, interference cancellation may terminate, and the estimate of the desired information may be used for further processing, such as error correction decoding and or other post-processing.

If the predetermined iteration criterion is not satisfied, however, M interferer spreading sequences are detected from the combined correlations (Block 735), along with respective symbol estimates for respective ones of the detected M interferer sequences (Block 740). Respective ones of the symbol estimates are then spread according to the respective corresponding spreading sequences (Block 745), summed to generate a composite spread signal (Block 750), and scrambled (Block 755). A channel estimate is then applied to the scrambled composite signal to generate an estimate of a composite interfering component of the baseband signal (Block 760). The estimate of the interfering signal component is then used to generate a new version of the baseband signal, e.g., by subtraction or projection (Block 765). The new version of the baseband signal is then subjected to further processing to generate an estimate of the desired information (Blocks 715–730) and, if the iteration criterion is still not met, is subjected to further interference cancellation (Blocks 735–765).

In systems that concurrently use multiple spreading factors, changing the "effective" interferer spreading codes on a symbol-by-symbol basis, the above-described methods and apparatus for detection of interferer spreading sequences preferably process the baseband signal r(k) done on a symbol-by-symbol basis, such that the unit upon which the recursive baseband processor 392 operates represents data corresponding to a single symbol period of the desired signal. In systems which utilize a common spreading factor, e.g., in systems conforming to the IS-95 specification, such an approach may not be optimal, as the spreading factors generally do not change, and the spreading sequences actively in use tend to change at a relatively slow rate. In such systems, interferer sequences may be detected on an intermittent basis and used to generate estimates of interfering signal components intervening periods. For example, interferer sequences may be detected for selected symbol periods, and used to generate estimates of interfering signal components for symbol periods other than the selected symbol periods.

Figure 8A:
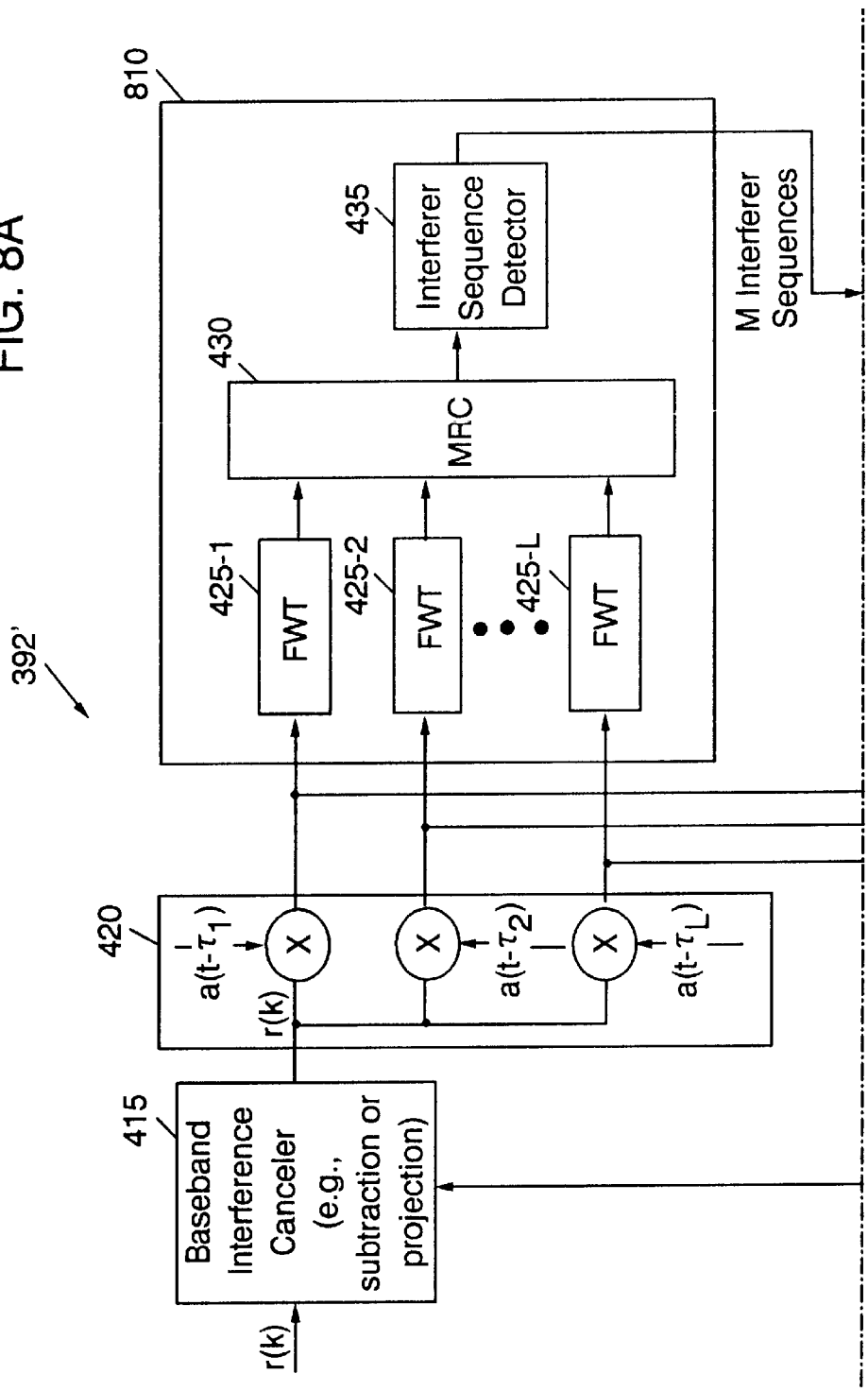
FIG. 8 is a schematic diagram illustrating a reduced-complexity baseband interference canceling receiver.
Figure 8B:
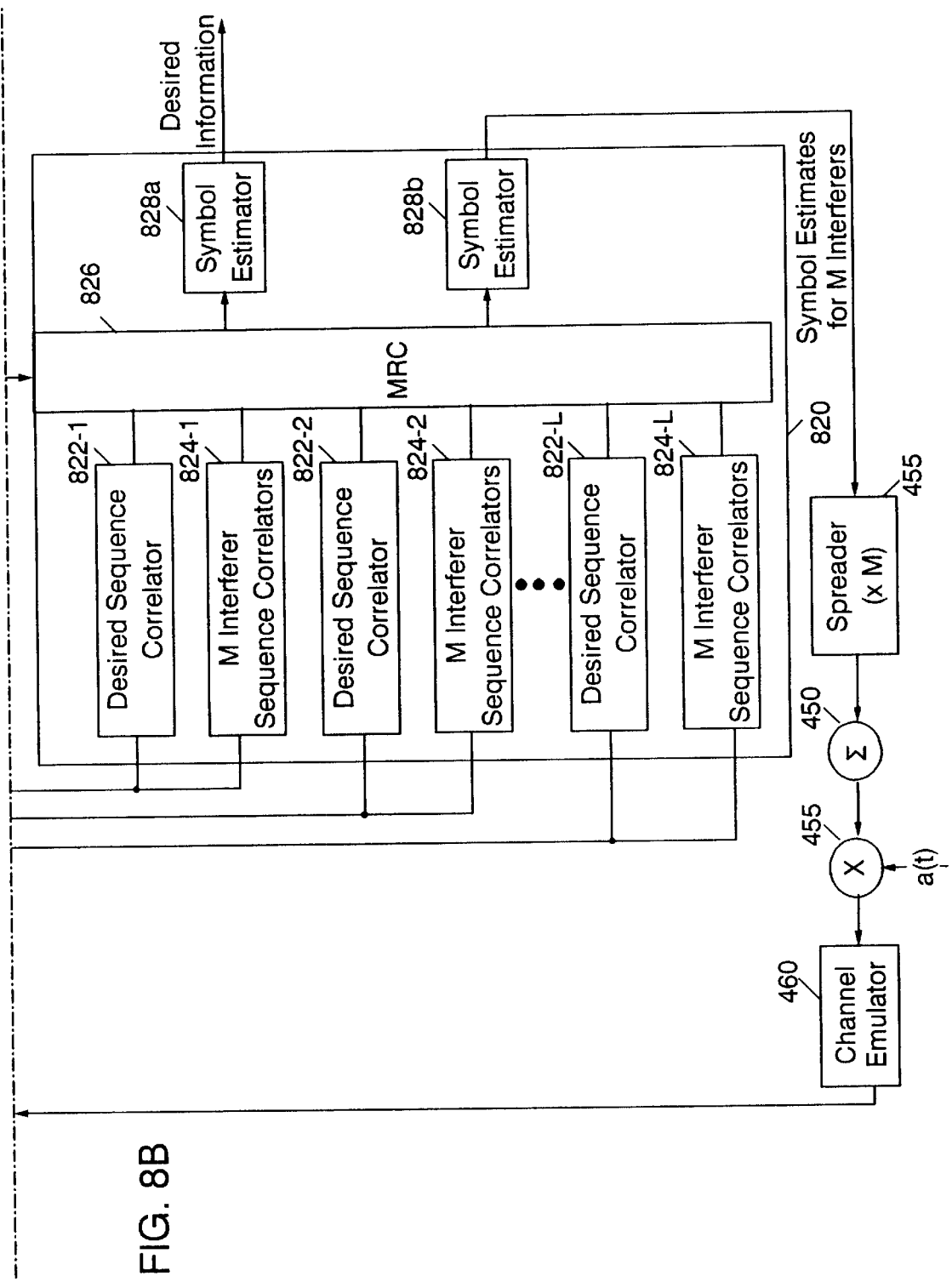

FIG. 8 illustrates a recursive baseband processor 392' according to an embodiment the present invention that performs such intermittent interferer sequence detection. Portions of the recursive baseband processor 392' that are the same as portions of the recursive baseband processor 392 of FIG. 4 are indicated with like reference numerals, description of which is omitted in light of the prior discussion of FIG. 4. The recursive baseband processor 392' of FIG. 8 differs from the recursive baseband processor 392 of FIG. 4 in that it includes an interferer sequence detection unit 810 that detects one or more interferer spreading sequences from descrambled multipath signal components of a baseband signal r(k) for selected symbol periods, using FWTs 425-1, 425-2, . . . , 425-L, MRC 430 and interferer sequence detector 435. A symbol estimation unit 820 uses the sequences detected by the interferer sequence detection unit 810 to generate estimates of interferer symbols in other symbol periods.

The symbol estimation unit 810 correlates descrambled multipath components for other symbol periods with the desired sequence and the identified M interferer sequences using respective desired sequence correlators 822-1, 822-2, . . . , 822-L, and interferer sequence correlators 824-1, 824-2, . . . , 824-L. The correlations of the multipath signal components with the desired sequence are maximal ratio combined in MRC 826, producing a decision statistic that is used by a first symbol estimator 828a to generate an estimate of a symbol encoded according to the desired spreading sequence. The correlations of the multipath signal components with the M interferer sequences are similarly combined by MRC 826, producing decision statistics for generating symbol estimates for the corresponding interferer sequences in a second symbol, estimator 828b.

If an iteration criterion is not satisfied, the symbol estimates for the M interferer sequences are spread according to their respective corresponding spreading sequences in spreader 445, summed in summer 450, and scrambled by scrambler 455. A channel estimate is applied to the scrambler output by a channel emulator 460, producing an estimate of an interfering signal component associated with the M interferer sequences. A baseband interference canceler 415 generates a new version f̂(k) of the baseband signal from the previous version of the baseband signal and the estimate of the interfering signal component, for example, by the subtraction or projection techniques described above.

In a subsequent pass, this new version f̂(k) of the baseband signal may be processed in a manner similar to the original baseband signal r(k). As with the recursive baseband processor 392 of FIG. 4, a variety of iteration schemes can be used, including error and/or iteration count controlled processing and cancellation of interferers in a groupwise fashion. As with the recursive baseband processor 392 of FIG. 4, the baseband interference canceler 415 of the recursive baseband processor 392' may use a number of different techniques to modify the baseband signal, such as subtraction or projection.

It will be understood that the recursive baseband processor 392' of FIG. 8 may, in general, be implemented using a variety of hardware and/or software components. The recursive baseband processor 392' may, for example, be implemented using special-purpose hardware such as gate arrays or ASICs, software or firmware executing on special purpose processing devices or on general purpose processing devices such as microprocessors, microcontrollers or DSP chips, or combinations thereof.

Figure 9B:
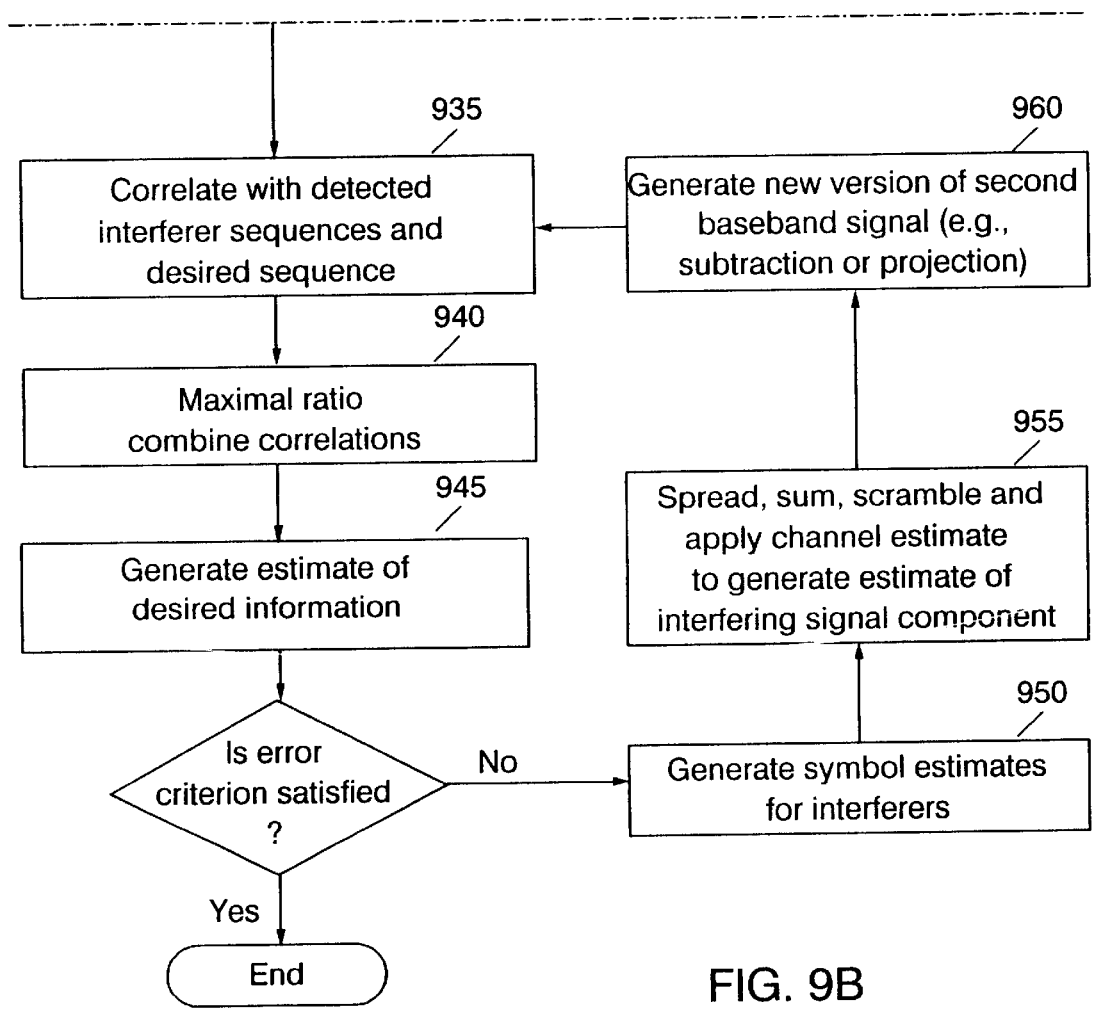
FIG. 9 is a flowchart illustrating exemplary baseband interference cancellation operations for the receiver of FIG. 8.

Exemplary interference cancellation operations 900 that may be performed by an apparatus such as the recursive baseband processor 392' of FIG. 8 are illustrated in FIG. 9. A communications signal is received from a communications medium (Block 905), and is processed to generate a first baseband signal corresponding to a first transmitted symbol (Block 910). The first baseband signal is correlated with a set of spreading sequences (Block 915), the correlations are maximal ratio combined (Block 920), and M interferer sequences are detected from the combined correlations (Block 925).

The received signal is further processed to generate a second baseband signal corresponding to a second transmitted symbol (Block 930). The second baseband signal is correlated with a desired sequence and the M interferer sequences (Block 935), and the resulting correlations are maximal ratio combined (Block 940). An estimate of desired information, i.e., information transmitted according to the desired sequence, is generated from the MRC results (Block 945). If a predetermined iteration criterion is satisfied, interference cancellation for the second symbol terminates, and the estimate of the desired information is used for further processing, such as error correction decoding.

If the predetermined iteration criterion is not satisfied, however, symbol estimates corresponding to the M identified interferer sequences are generated from the MRC results (Block 950). The symbol estimates are then spread, scrambled, summed and processed according to a channel estimate to generate an estimate of a interfering signal component associated with the M interferer sequences (Block 955). A new version of the baseband signal is then generated from the previous version of the baseband signal and the estimate of the interfering signal component, e.g.; by subtraction or projection (Block 960). The new version of the baseband signal is then subjected to further processing to generate a new estimate of the desired information (Blocks 935–945) and, if the iteration criterion is still not met, is subjected to further interference cancellation (Blocks 950–960).

According to yet another aspect of the present invention, a subspace cancellation approach is used in which respective estimates of baseband interference components corresponding to respective detected interferer spreading sequences are separately generated and processed to produce respective estimates of associated interfering signal components, in contrast to the composite approaches described above. A projection technique is used to generate a new, interference-compensate version of a baseband signal from a previous version of the baseband signal and the estimates of the interfering signal components.

Figure 10B:
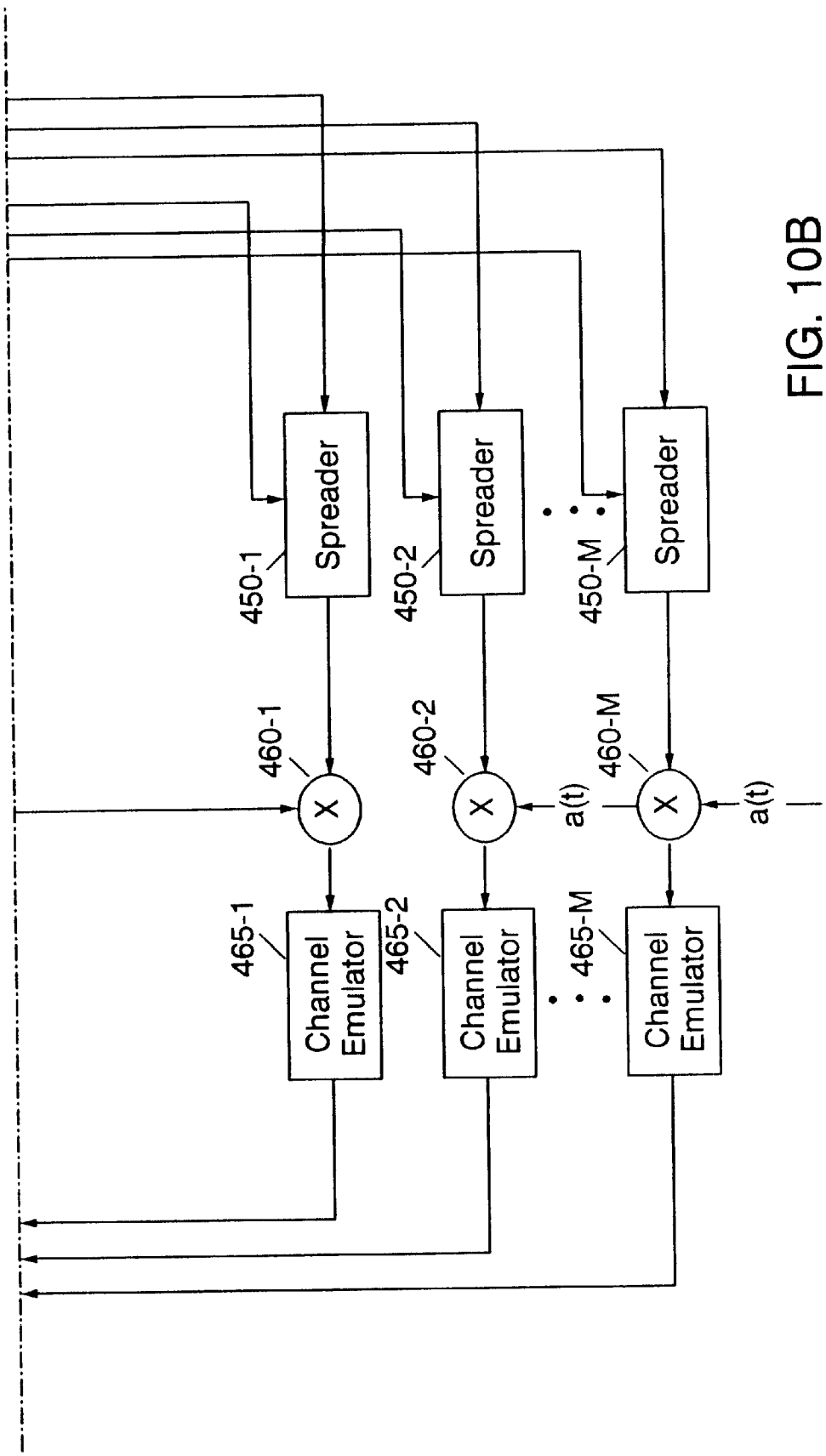
FIG. 10 is a schematic diagram illustrating a baseband interference canceling receiver according to another aspect of the present invention.

As illustrated in FIG. 10, an exemplary recursive baseband processor 392" according to this aspect of the present invention is similar to the recursive baseband processor 392 of FIG. 4, with like elements indicated by like reference numerals, description of which is omitted in light of the prior discussion of FIG. 4. The recursive baseband processor 392" of FIG. 10 differs from the recursive baseband processor 392 of FIG. 4 in that, instead of combining the spread signals produced by the spreaders 450-1, 450-2, . . . , 450-M, the recursive baseband processor 392" separately scrambles and applies a channel estimate the spread signals produced by the spreaders 450-1, 450-2, . . . , 450-M, in respective separate scramblers 460-1, 460-2, . . . ,460-M, and channel emulators 465-1, 465-2, . . . , 465-M, producing respective estimates of interfering signal components corresponding to respective ones of the M detected interferer spreading sequences. A projection technique is then used by a projection interference canceler 415' to generate a new version f̂(k) of the baseband signal. This new version can in turn be subjected further processing, in the same manner as the original version of the baseband signal.

It will be understood that the recursive baseband processor 392" of FIG. 10 may, in general, be implemented using a variety of hardware and/or software components. The recursive baseband processor 392" may, for example, be implemented using special-purpose hardware such as gate arrays or ASICs, software or firmware executing on special purpose processing devices or on general purpose processing devices such as microprocessors, microcontrollers or DSP chips, or combinations thereof.

Figure 11:
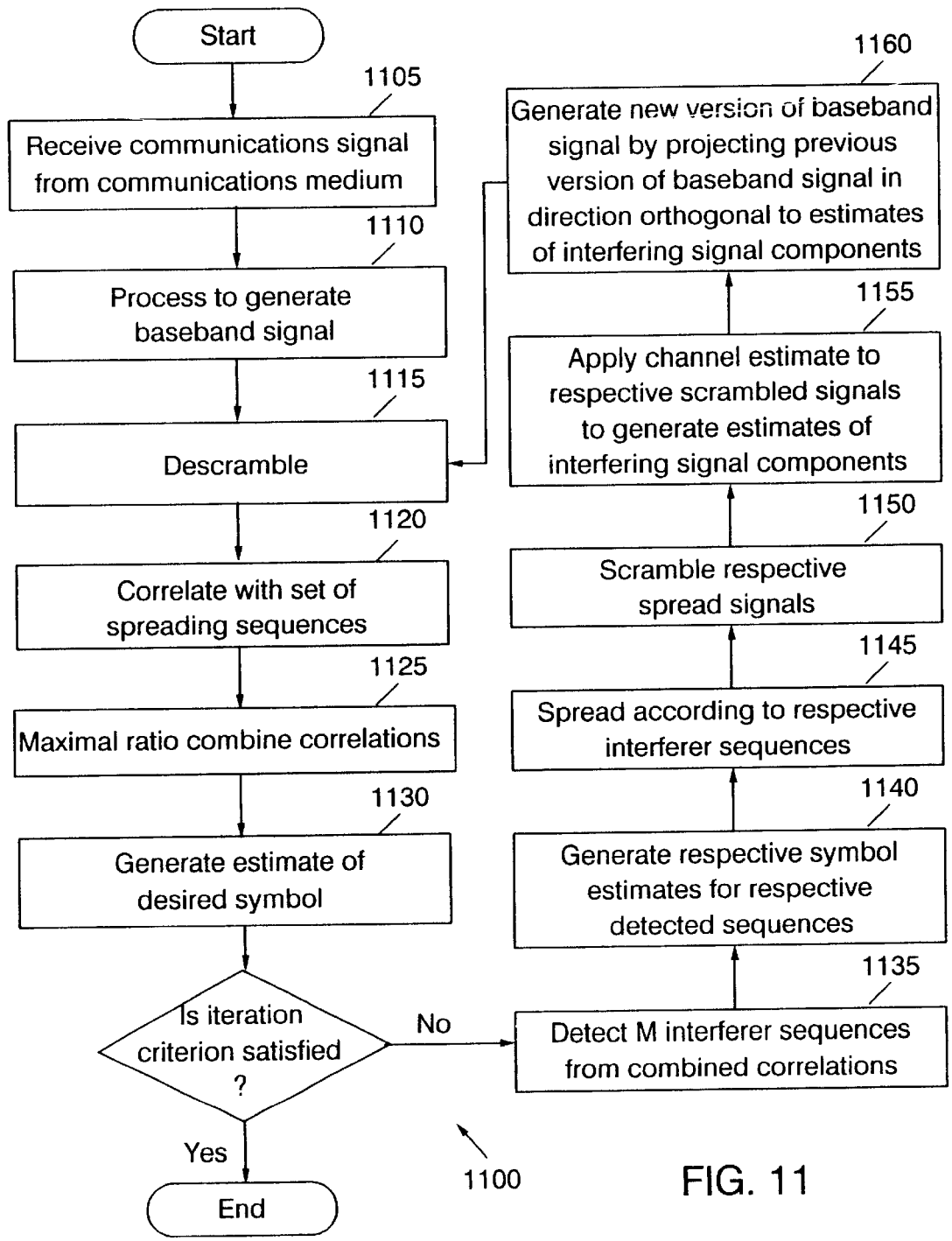
FIG. 11 is a flowchart illustrating exemplary baseband interference cancellation operations for the receiver of FIG. 9.

Exemplary operations 1100 for the recursive baseband processor 392" of FIG. 10 are illustrated in FIG. 11. A communications signal is received (Block 1105), and processed to produce a baseband signal (Block 1110). The baseband signal is descrambled (Block 1115), and correlated with a set of spreading sequences (Block 1120). The correlations thus produced are then maximal ratio combined (Block 1125), and an estimate of information transmitted according to a desired sequence is generated from the combined correlations (Block 1130). If an iteration criterion (e.g., a predetermined iteration count and/or error criterion such as bit error rate) is satisfied, interference cancellation may terminate, and the estimate of the desired information used for further processing, such as error correction decoding or other post-processing.

If the iteration criterion is not satisfied, however, one or more interferer spreading sequences are detected from the combined correlations (Block 1135), along with respective symbol estimates for respective ones of the detected interferer sequences (Block 1140). Respective ones of the symbol estimates are then spread according to the respective corresponding spreading sequences (Block 1145), scrambled (Block 1150), and processed according to a channel estimate (Block 1155) to generate respective estimates of respective interfering components of the baseband signal corresponding to respective ones of the detected interferer spreading sequences. The estimates of the interfering signal components are then used to generate a new version of the baseband signal, by projection of the previous version of the baseband signal in a direction in signal space that is orthogonal to the estimates of the interfering signal components (Block 1160). The new version of the baseband signal is then subjected to further processing to generate an estimate of the desired information (Blocks 1115–1130) and, if the iteration criterion is still not met, is subjected to further interference cancellation (Blocks 1135–1160).

In order to further understand this subspace cancellation approach, a mathematical explanation of cancellation of the M strongest interferers using Gram-Schmidt techniques will now be provided. It will be understood that this explanation is offered for illustrative purposes, and does not serve to limit the scope of the present invention to the procedures described.

Denoting the M interferers at an ith iteration by the vectors $I_1(i), I_2(i), \ldots, I_M(i)$, Gram-Schmidt procedures are carried out on an ordered vector set $\{I_m(i); m=1, \ldots, M\}$ as follows:

$$g_1(i) = \frac{I_1(i)}{\sqrt{I_1^H(i)I_1(i)}}, \tag{1}$$

$$v_k(i) = I_k(i) - \sum_{m=1}^{k-1}(g_m^H(i)I_k(i))g_m(i), \tag{2}$$

and $$g_k(i) = \frac{v_k(i)}{\sqrt{v_k^H(i)v_k(i)}}, \text{ for } k = 2, \ldots, M, \tag{3}$$

wherein $g_1(i), \ldots, g_k(i)$ denote unit vectors which span a subspace defined by interferers $I_1(i), I_2(i), \ldots, I_k(i)$, $V_k(i)$ denote vectors in the directions of the unit vectors $g_1(i), \ldots, g_k(i)$, and the columns of the matrix $G_M(i)=[g_1(i), \ldots, g_M(i)]$ span an interference subspace $S_M(i)$. Projection of a signal vector r(i) onto a space orthogonal to the interference subspace $S_M(i)$ may be achieved by applying a projection matrix $P_{Gm}$ $$P_{G_M} = I_{N \times N} - G_M(G_M^H G_M)^{-1} G_M^H, \tag{4}$$

computed for a preceding (i–1)th iteration to the signal vector r(i) such that $$r(i) = P_{G_M}(i-1)r(i-1), \tag{5}$$

where an initial value r(0) is the original baseband signal vector. As the columns of the matrix $G_M(i)$ are orthonormal vectors, equation (4) can be simplified to:

$$P_{G_M} = I_{N \times N} - \sum_{m=1}^{M} g_M^H g_M. \tag{6}$$

Equations (5) and (6) may be combined to produce:

$$r(i) = r(i-1) - \sum_{m=1}^{M} g_M(i-1)g_M^H(i-1)r(i-1). \tag{7}$$

For Q iterations, the modified baseband signal vector $\hat{r}$ is given by:

$$\hat{r} = \prod_{q=1}^{Q}\left(I_{N \times N} - \sum_{m=1}^{M} g_m(q)g_m^H(q)\right)r. \tag{8}$$

An advantage of the subspace approach is that the subspace cancellation approach can be employed on a frame-by-frame basis, even when variable spreading factors are used, as the interferer symbol estimates are not combined and scrambled on a symbol-by-symbol basis. This feature can be used to reduce the computational burden associated with the interference cancellation process. Limited simulations conducted by the present inventors indicate that the subspace cancellation approach can produce better results (e.g., increased potential system capacity for a given error rate or decreased error rate for a given system capacity) than the previously described approaches, but this increased performance may require increased computational complexity. Simulation results also indicate that the subspace cancellation approach may require more iterations to produce a given performance level, but that the number of iterations required to reach a given level of performance may be reduced by increasing the number of interferers canceled. In non-variable spreading factor applications, for example, in IS-95 systems, subspace cancellation may be used with intermittent sequence detection in a manner similar to that described with respect to FIG. 8, potentially reducing receiver complexity.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of recovering information from a communications signal that includes desired information and interference, the method comprising the steps of:
   processing the communications signal to produce a baseband signal;
   detecting a spreading sequence from the baseband signal;
   generating an estimate of an interfering signal component of the baseband signal associated with the detected spreading sequence;
   generating a new version of the baseband signal from a previous version of the baseband signal based on the generated estimate of the interfering signal component; and
   estimating the desired information from the new version of the baseband signal.

2. A method according to claim 1, wherein said step of detecting a spreading sequence comprises the steps of:
   resolving a version of the baseband signal into a plurality of signal components, respective ones of which are associated with respective propagation paths;
   correlating the resolved plurality of signal components with a set of spreading sequences including the spreading sequence associated with the interfering signal component to generate respective sets of correlations for respective ones of the resolved signal components;
   combining correlations to generate a plurality of combined correlations, respective ones of which correspond to respective ones of the spreading sequences; and
   detecting the spreading sequence associated with the interfering signal component from the generated combined correlations.

3. A method according to claim 2:
wherein said step of resolving comprises the step of descrambling a version of the baseband signal according to a scrambling sequence to generate the resolved plurality of signal components;
wherein said step of generating an estimate of the interfering signal component comprises the steps of:
generating an estimate of a symbol transmitted according to the detected spreading sequence from one of the combined correlations that is associated with the detected spreading sequence; and
processing the estimate of the symbol according to the detected spreading sequence, the scrambling sequence and a channel estimate to generate an estimate of the interfering signal component.

4. A method according to claim 2:
wherein said step of resolving comprises the step of descrambling a version of the baseband signal according to a scrambling sequence to generate the resolved plurality of signal components;
wherein said step of detecting a spreading sequence associated with an interfering signal component comprises the step of detecting a plurality of spreading sequences from the resolved plurality of signal components, respective ones of the detected plurality of spreading sequences being associated with respective ones of a plurality of interfering signal components in the communications signal; and
wherein said step of generating an estimate of the interfering signal component comprises the steps of:
generating respective estimates of symbols encoded according to respective ones of the detected spreading sequences from respective ones of the combined correlations associated with the detected spreading sequences; and
processing the estimates of the encoded symbols according to the detected spreading sequences, the scrambling sequence and a channel estimate to generate an estimate of the plurality of interfering signal components; and
wherein said step of generating new version of the baseband signal comprises the step of generating a new version of the baseband signal from a previous version of the baseband signal and the generated estimate of the plurality of interfering signal components.

5. A method according to claim 4;
wherein said step of processing the estimates of the encoded symbols comprises the steps of:
spreading respective ones of the estimates of the encoded symbols according to corresponding respective ones of the spreading sequences;
combining the spread estimates of the encoded symbols to generate a composite signal;
scrambling the composite signal according to the scrambling sequence; and
processing the scrambled composite signal according to the channel estimate to generate a composite estimate of the plurality of interfering signal components; and
wherein said step of generating a new version of the baseband signal comprises the step of generating a new version of the baseband signal from a previous version of the baseband signal and the generated composite estimate of the plurality of interfering signal components.

6. A method according to claim 5, wherein said step of generating a new version of the baseband signal comprises the step of subtracting the composite estimate of the plurality of interfering signal components from a previous version of the baseband signal to generate a new version of the baseband signal.

7. A method according to claim 5, wherein said step of generating a new version of the baseband signal comprises the step of determining a projection of a previous version of the baseband signal in a direction in signal space orthogonal to the composite estimate of the plurality of interfering signal components.

8. A method according to claim 7, wherein said step of determining a new version of the baseband signal comprises the step of performing a Gram-Schmidt orthogonalization.

9. A method according to claim 4:
wherein said step of processing the estimates of the encoded symbols comprises the steps of:
spreading respective ones of the estimates of the encoded symbols according to corresponding respective ones of the spreading sequences;
scrambling the spread estimates of the encoded symbols according to the scrambling sequence to generate a plurality of scrambled spread signals; and
processing respective ones of the scrambled spread signals according to the channel estimate to generate respective estimates of respective one of the plurality of interfering signal components; and
wherein said step of generating a new version of the baseband signal comprises the step of generating a new version of the baseband signal from a previous version of the baseband signal and the generated estimates of the plurality of interfering signal components.

10. A method according to claim 9, wherein said step of generating a new estimate of the baseband signal comprises the step of determining a projection of a previous version of the baseband signal in a direction in signal space orthogonal to the generated estimates of the plurality of interfering signal components.

11. A method according to claim 10, wherein said step of determining a new version of the baseband signal comprises the step of performing a Gram-Schmidt orthogonalization.

12. A method according to claim 1, wherein said step of generating a new version of the baseband signal comprises the step of subtracting the estimate of the interfering signal component from a previous version of the baseband signal to generate the new version of the baseband signal.

13. A method according to claim 1, wherein said step of generating a new version of the baseband signal comprises the step of determining a projection of a previous version of the baseband signal in a direction in signal space orthogonal to the estimate of the interfering signal component.

14. A method according to claim 1, wherein the desired information is transmitted according to a desired spreading sequence, and wherein said step of estimating the desired information comprises the steps of:
resolving the new version of the baseband signal into a plurality of interference-canceled signal components, respective ones of which are associated with respective propagation paths;
correlating the resolved plurality of interference-canceled signal components with the desired spreading sequence to generate a set of correlations for the resolved interference-canceled signal components;
combining correlations of the set of correlations for the resolved interference-canceled signal components; and
estimating the desired information from the combined correlations.

15. A method according to claim 14, wherein said step of combining comprises the step of maximal ratio combining.

16. A method according to claim 2, wherein said step of correlating comprises the step of Walsh-Hadamard transforming each of the plurality of resolved signal components.

17. A method according to claim 2, wherein respective ones of the combined correlations indicate respective strengths for respective interfering signals associated with respective spreading sequences of the set of spreading sequences, and wherein said step of detecting a spreading sequence comprises the step of identifying a spreading sequence having an associated interfering signal satisfying a predetermined signal strength criterion.

18. A method according to claim 1:
wherein said step of detecting comprises the step of detecting a first spreading sequence associated with a first interfering signal component;
wherein said step of generating an estimate of the interfering signal component comprises the step of generating an estimate of the first interfering signal component from the detected first spreading sequence;
wherein said step of generating a new version of the baseband signal comprises the step of generating a first version of the baseband signal from a previous version of the baseband signal and the generated estimate of the first interfering signal component;
wherein said step of detecting further comprises the step of detecting a second spreading sequence associated with a second interfering signal component from the first version of the baseband signal;
wherein said step of generating an estimate of the interfering signal component further comprises the step of generating an estimate of the second interfering signal component for the detected second spreading sequence; and
wherein said step of generating a new version of the baseband signal further comprises the step of generating a second version of the baseband signal from the first version of the baseband signal and the generated estimate of the second interfering signal component.

19. A method according to claim 1, wherein said steps of generating an estimate of the interfering signal component and generating a new version of the baseband signal are repeatedly performed until an iteration criterion is satisfied.

20. A method according to claim 19, wherein the iteration criterion comprises at least one of an error rate or an iteration count.

21. A method according to claim 1, wherein said step of detecting a spreading sequence comprises the step of detecting spreading sequences on a symbol-by-symbol basis.

22. A method according to claim 1, wherein said step of detecting a spreading sequence comprises the step of intermittently detecting spreading sequences for selected symbol periods.

23. A method according to claim 22:
wherein said step of detecting a spreading sequence comprises the step of detecting the spreading sequence from a first portion of the baseband signal corresponding to a first transmitted symbol;
wherein said step of generating an estimate of an interfering signal component comprises the step of generating an estimate of the interfering signal component from a second portion of the baseband signal associated with a second transmitted symbol based on the detected spreading sequence;
wherein said step of generating a new version of the baseband signal comprises the step of generating a new version of the second portion of the baseband signal from a previous version of the second portion of the baseband signal and the generated estimate of the interfering signal component; and
wherein said step of estimating the desired information comprises the step of estimating the second transmitted symbol from the new version of the second portion of the baseband signal.

24. A method of recovering information from communications signal including interfering components, the method comprising the steps of:
correlating a version of the communications signal with a set of spreading sequences;
detecting a spreading sequence associated with an interfering signal component of the communications signal from correlations of the version of the communications signal with the set of spreading sequences;
generating an estimate of an interfering signal component of the communications signal associated with the detected spreading sequence;
generating a new version of the communications signal from the previous version of the communications signal based on the estimate of the interfering signal component; and
estimating information in the communications signal from the new version of the communications signal.

25. A method according to claim 24:
wherein said step of correlating comprises the steps of:
resolving the version of the communications signal into a plurality of multipath signal components; and
correlating each of the resolved multipath signal components with the set of spreading sequences to produce a plurality of sets of correlations, respective ones of which are associated with respective ones of the spreading sequences; and
wherein said step of detecting comprises the step of:
combining correlations in each of the sets of correlations; and
detecting the spreading sequence from the combined correlations.

26. A method according to claim 25:
wherein said step of resolving comprises the step of descrambling the version of the communications signal according to a scrambling sequence to generate the resolved plurality of signal components;
wherein said step of generating an estimate of the interfering signal component comprises the steps of:
generating an estimate of a symbol transmitted according to the detected spreading sequence from the combined correlation associated with the detected spreading sequence; and
processing the estimate of the symbol according to the detected spreading sequence, the scrambling sequence and a channel estimate to generate an estimate of the interfering signal component.

27. A method according to claim 24, wherein said step of generating a new version of the communications signal comprises the step of subtracting the estimate of the interfering signal component from a previous version of the communications signal to generate the new version of the communications signal.

28. A method according to claim 24, wherein said step of generating a new version of the communications signal comprises the step of determining a projection of a previous version of the communications signal in a direction in signal space orthogonal to the estimate of the interfering signal component.

29. A method according to claim 24, wherein said step of estimating information in the communications signal comprise the steps of:
   resolving the new version of the communications signal into a plurality of multipath signal components;
   correlating the resolved plurality of interference-canceled signal components with a desired spreading sequence to generate a set of correlations;
   combining correlations of the set of correlations; and
   estimating information in the communications signal from the combined correlations.

30. A method according to claim 24, wherein said steps of correlating, detecting a spreading sequence, generating an estimate of an interfering signal component, and generating a new version of the communications signal are repeatedly performed until an iteration criterion is satisfied.

31. A method according to claim 30, wherein the iteration criterion comprises at least one of an error rate or an iteration count.

32. A method according to claim 24, wherein said steps of correlating, detecting, generating an estimate of an interfering signal component, and generating a new version of the communications signal are performed on at least one of a symbol-by-symbol basis or a frame-by-frame basis.

33. An apparatus for recovering information from a communications signal that includes desired information and interference, the apparatus comprising:
   means for processing the communications signal to produce a baseband signal;
   means for detecting a spreading sequence from the baseband signal;
   means for generating an estimate of an interfering signal component of the baseband signal associated with the detected spreading sequence;
   means for generating a new version of the baseband signal from a previous version of the baseband signal based on the generated estimate of the interfering signal component; and
   means for estimating the desired information from the new version of the baseband signal.

34. An apparatus according to claim 33, wherein said means for detecting a spreading sequence comprises:
   means for resolving a version of the baseband signal into a plurality of signal components, respective ones of which are associated with respective propagation paths;
   means for correlating the resolved plurality of signal components with a set of spreading sequences including the spreading sequence associated with the interfering signal component to generate respective sets of correlations for respective ones of the resolved signal components;
   means for combining correlations to generate a plurality of combined correlations, respective ones of which correspond to respective ones of the spreading sequences; and
   means for detecting the spreading sequence associated with the interfering signal component from the generated combined correlations.

35. An apparatus according to claim 34:
   wherein said means for resolving comprises means for descrambling a version of the baseband signal according to a scrambling sequence to generate the resolved plurality of signal components;
   wherein said means for generating an estimate of the interfering signal component comprises:
      means for generating an estimate of a symbol transmitted according to the detected spreading sequence from one of the combined correlations that is associated with the detected spreading sequence; and
      means for processing the estimate of the symbol according to the detected spreading sequence, the scrambling sequence and a channel estimate to generate an estimate of the interfering signal component.

36. An apparatus according to claim 34:
   wherein said means for resolving comprises means for descrambling a version of the baseband signal according to a scrambling sequence to generate the resolved plurality of signal components;
   wherein said means for detecting a spreading sequence associated with an interfering signal component comprises means for detecting a plurality of spreading sequences from the resolved plurality of signal components, respective ones of the detected plurality of spreading sequences being associated with respective ones of a plurality of interfering signal components in the communications signal; and
   wherein said means for generating an estimate of the interfering signal component comprises:
      means for generating respective estimates of symbols encoded according to respective ones of the detected spreading sequences from respective ones of the combined correlations associated with the detected spreading sequences; and
      means for processing the estimates of the encoded symbols according to the detected spreading sequences, the scrambling sequence and a channel estimate to generate an estimate of the plurality of interfering signal components; and
   wherein said means for generating new version of the baseband signal comprises means for generating a new version of the baseband signal from a previous version of the baseband signal and the generated estimate of the plurality of interfering signal components.

37. An apparatus according to claim 36:
   wherein said means for processing the estimates of the encoded symbols comprises:
      means for spreading respective ones of the estimates of the encoded symbols according to corresponding respective ones of the spreading sequences;
      means for combining the spread estimates of the encoded symbols to generate, a composite signal;
      means for scrambling the composite signal according to the scrambling sequence; and
      means for processing the scrambled composite signal according to the channel estimate to generate a composite estimate of the plurality of interfering signal components; and
      wherein said means for generating a new version of the baseband signal comprises means for generating a new version of the baseband signal from a previous version of the baseband signal and the generated composite estimate of the plurality of interfering signal components.

38. An apparatus according to claim 37, wherein said means for generating a new version of the baseband signal comprises means for subtracting the composite estimate of the plurality of interfering signal components from a previous version of the baseband signal to generate a new version of the baseband signal.

39. An apparatus according to claim 37, wherein said means for generating a new version of the baseband signal comprises means for determining a projection of a previous version of the baseband signal in a direction in signal space orthogonal to the composite estimate of the plurality of interfering signal components.

40. An apparatus according to claim 39, wherein said means for determining a new version of the baseband signal comprises means for performing a Gram-Schmidt orthogonalization.

41. An apparatus according to claim 36:
wherein said means for processing the estimates of the encoded symbols comprises:
means for spreading respective ones of the estimates of the encoded symbols according to corresponding respective ones of the spreading sequences;
means for scrambling the spread estimates of the encoded symbols according to the scrambling sequence to generate a plurality of scrambled spread signals; and
means for processing respective ones of the scrambled spread signals according to the channel estimate to generate respective estimates of respective one of the plurality of interfering signal components; and
wherein said means for generating a new version of the baseband signal comprises means for generating a new version of the baseband signal from a previous version of the baseband signal and the generated estimates of the plurality of interfering signal components.

42. An apparatus according to claim 41, wherein said means for generating a new estimate of the baseband signal comprises means for determining a projection of a previous version of the baseband signal in a direction in signal space orthogonal to the generated estimates of the plurality of interfering signal components.

43. An apparatus according to claim 42, wherein said means for determining a new version of the baseband signal comprises means for performing a Gram-Schmidt orthogonalization.

44. An apparatus according to claim 33, wherein said means for generating a new version of the baseband signal comprises means for subtracting the estimate of the interfering signal component from a previous version of the baseband signal to generate the new version of the baseband signal.

45. An apparatus according to claim 33, wherein said means for generating a new version of the baseband signal comprises means for determining a projection of a previous version of the baseband signal in a direction in signal space orthogonal to the estimate of the interfering signal component.

46. An apparatus according to claim 33, wherein the desired information is transmitted according to a desired spreading sequence, and wherein said means for estimating the desired information comprises:
means for resolving the new version of the baseband signal into a plurality of interference-canceled signal components, respective ones of which are associated with respective propagation paths;
means for correlating the resolved plurality of interference-canceled signal components with the desired spreading sequence to generate a set of correlations for the resolved interference-canceled signal components;
means for combining correlations of the set of correlations for the resolved interference-canceled signal components; and
means for estimating the desired information from the combined correlations.

47. An apparatus according to claim 46, wherein said means for combining comprises means for maximal ratio combining.

48. An apparatus according to claim 34, wherein said means for correlating comprises means for Walsh-Hadamard transforming each of the plurality of resolved signal components.

49. An apparatus according to claim 34, wherein respective ones of the combined correlations indicate respective strengths for respective interfering signals associated with respective spreading sequences of the set of spreading sequences, and wherein said means for detecting a spreading sequence comprises means for identifying a spreading sequence having an associated interfering signal satisfying a predetermined signal strength criterion.

50. An apparatus according to claim 33:
wherein said means for detecting comprises means for detecting a first spreading sequence associated with a first interfering signal component;
wherein said means for generating an estimate of the interfering signal component comprises means for generating an estimate of the first interfering signal component from the detected first spreading sequence;
wherein said means for generating a new version of the baseband signal comprises means for generating a first version of the baseband signal from a previous version of the baseband signal and the generated estimate of the first interfering signal component;
wherein said means for detecting further comprises means for detecting a second spreading sequence associated with a second interfering signal component from the first version of the baseband signal;
wherein said means for generating an estimate of the interfering signal component further comprises means for generating an estimate of the second interfering signal component for the detected second spreading sequence; and
wherein said means for generating a new version of the baseband signal further comprises means for generating a second version of the baseband signal from the first version of the baseband signal and the generated estimate of the second interfering signal component.

51. An apparatus according to claim 33, wherein said means for generating an estimate of the interfering signal component and said means for generating a new version of the baseband signal repeatedly generate estimates of interfering signal components and generate new versions of the baseband signal, respectively, until an iteration criterion is satisfied.

52. An apparatus according to claim 51, wherein the iteration criterion comprises at least one of an error rate or an iteration count.

53. An apparatus according to claim 33, wherein said means for detecting a spreading sequence comprises means for detecting spreading sequences on a symbol-by-symbol basis.

54. An apparatus according to claim 33, wherein said means for detecting a spreading sequence comprises means for intermittently detecting spreading sequences for selected symbol periods.

55. An apparatus according to claim 54:
wherein said means for detecting a spreading sequence comprises means for detecting the spreading sequence from a first portion of the baseband signal corresponding to a first transmitted symbol;
wherein said means for generating an estimate of an interfering signal component comprises means for generating an estimate of the interfering signal component from a second portion of the baseband signal associated with a second transmitted symbol based on the detected spreading sequence;

wherein said means for generating a new version of the baseband signal comprises means for generating a new version of the second portion of the baseband signal from a previous version of the second portion of the baseband signal and the generated estimate of the interfering signal component; and wherein said means for estimating the desired information comprises means for estimating the second transmitted symbol from the new version of the second portion of the baseband signal.

56. A receiver, comprising:

a recursive baseband processor that detects a spreading sequence from the baseband signal, generates an estimate of an interfering signal component of the baseband signal associated with the detected spreading sequence, generates an interference-canceled version of the baseband signal from the baseband signal based on correlations of the baseband signal with a set of spreading sequences, and generates an estimate the desired information from the interference-canceled version of the baseband signal.

57. A receiver according to claim 56, wherein said recursive baseband processor comprises:

a descrambler operative to resolve a version of the baseband signal into a plurality of signal components, respective ones of which are associated with respective propagation paths;

a correlator responsive to said descrambler and operative to correlate the resolved plurality of signal components with a set of spreading sequences to generate respective sets of correlations for respective ones of the resolved signal components;

a maximal ratio combiner responsive to said correlator and operative to combine correlations to generate a plurality of combined correlations, respective ones of which correspond to respective ones of the spreading sequences;

a spreading sequence detector responsive to said maximal ratio combiner and operative to detect the spreading sequence associated with the interfering signal component from the generated combined correlation;

a symbol estimator responsive to said maximal ratio combiner and operative to generate a symbol estimate for the interfering signal component;

a spreader responsive to said spreading sequence detector and to said symbol estimator and operative to spread the generated symbol estimate according to the detected spreading sequence;

a scrambler responsive to said spreader and operative to scramble the spread symbol estimate according to the scrambling sequence;

a channel emulator responsive to said scrambler and operative to process the scrambled spread symbol estimate according to a channel estimate to generate an estimate of the interfering signal component; and a baseband interference canceler responsive to said channel emulator and operative to generate a new version of the baseband signal from a previous version of the baseband signal and the generated estimate of the interfering signal component.

58. A receiver according to claim 57:

wherein said descrambler is further operative to resolve the new version of the baseband signal into a plurality of signal components, respective ones of which are associated with respective propagation paths;

wherein said correlator is further operative to correlate the resolved plurality of signal components of the new version of the baseband signal with a desired spreading sequence to generate a set of correlations for the resolved signal components of the new version of the baseband signal;

wherein said maximal ratio combiner is further operative to combine the set of correlations for the resolved signal components of the new version of the baseband signal to generate a decision statistic for symbol transmitted according to the desired spreading sequence and wherein said recursive baseband processor further comprises a symbol estimator responsive to said maximal ratio combiner and operative to generate an estimate of a symbol transmitted according to the desired spreading sequence from the generated decision statistic.

* * * * *